Nov. 26, 1940.　　A. MARCHEV ET AL　　2,222,983
SHEET ASSEMBLING MACHINE
Original Filed Jan. 30, 1937　　14 Sheets-Sheet 10
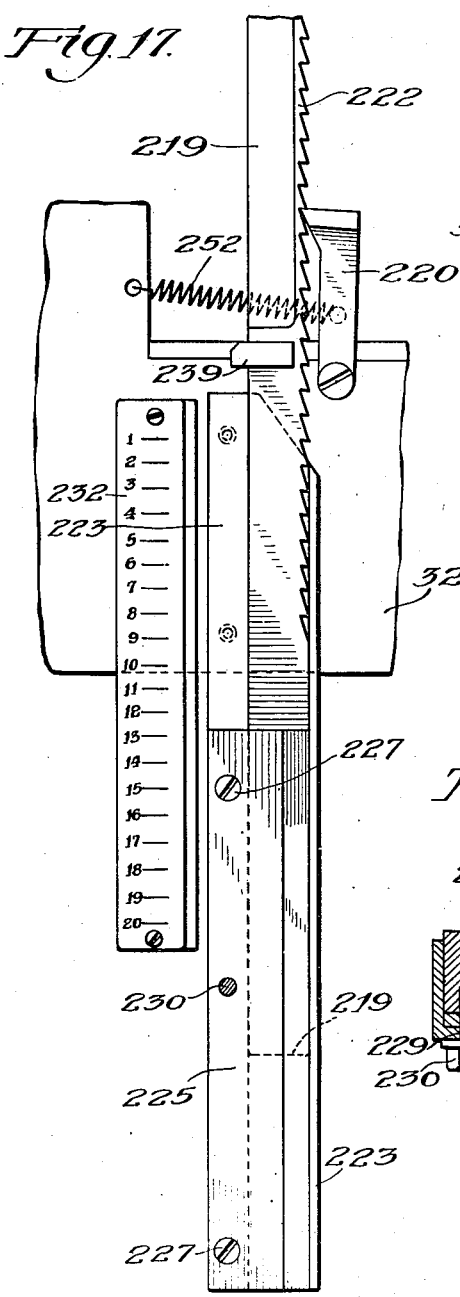
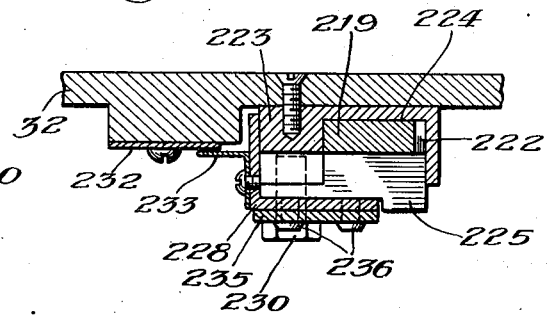
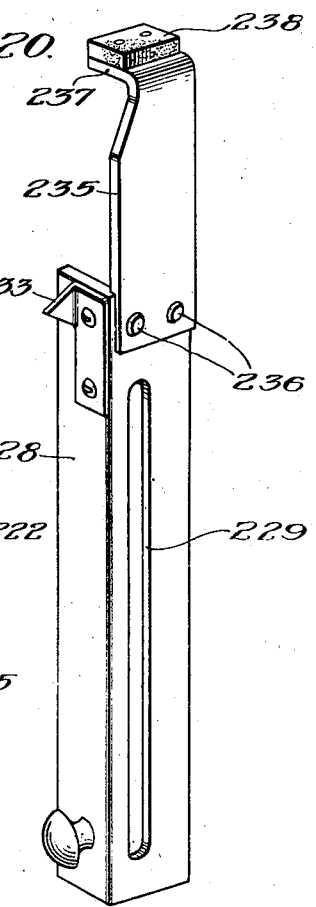
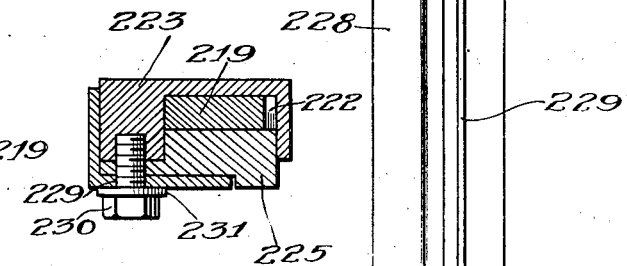
Inventors:
Alfred Marchev,
Cecil C. McCain
By: Zabel, Carlson & Wells
Attorneys

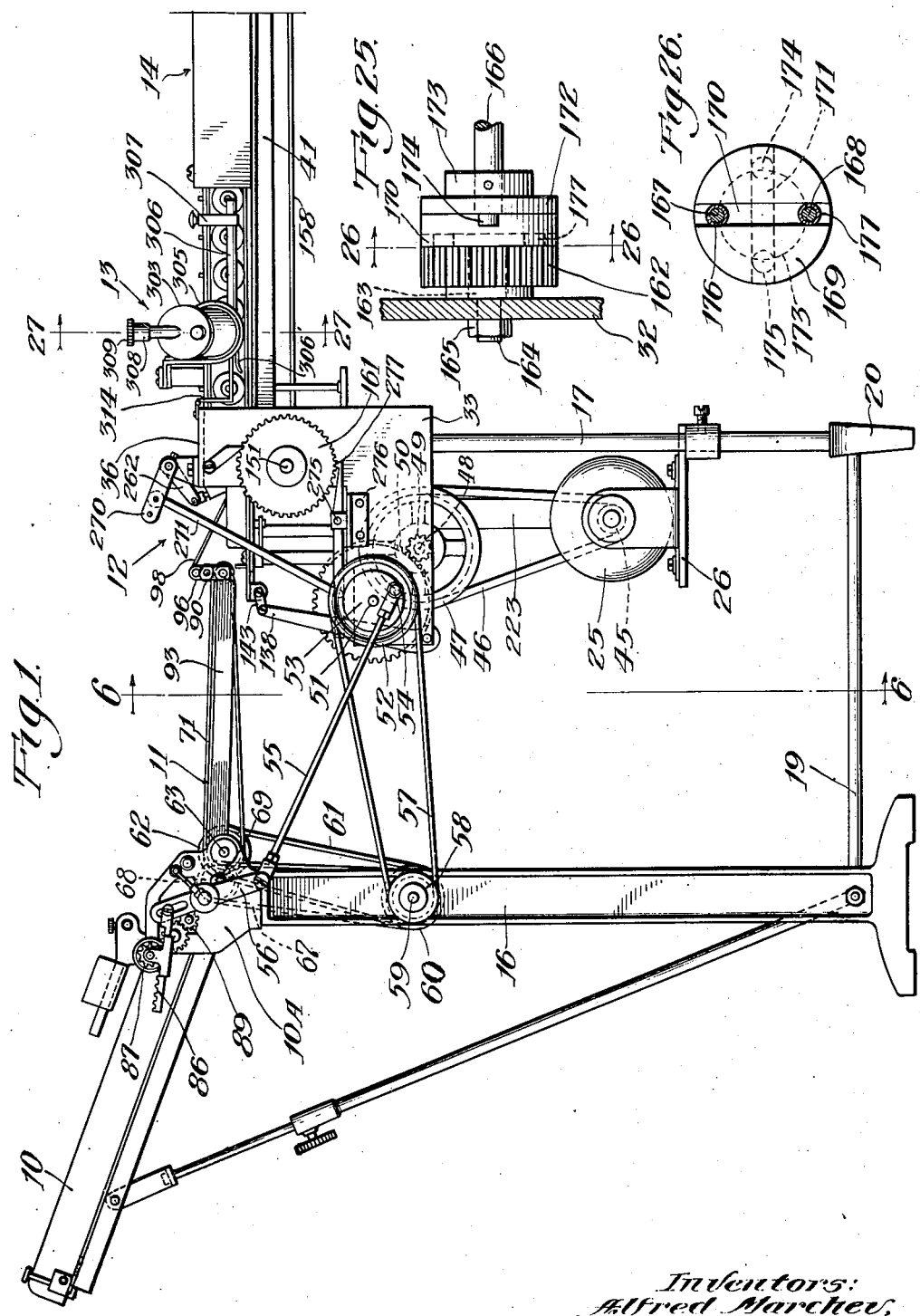

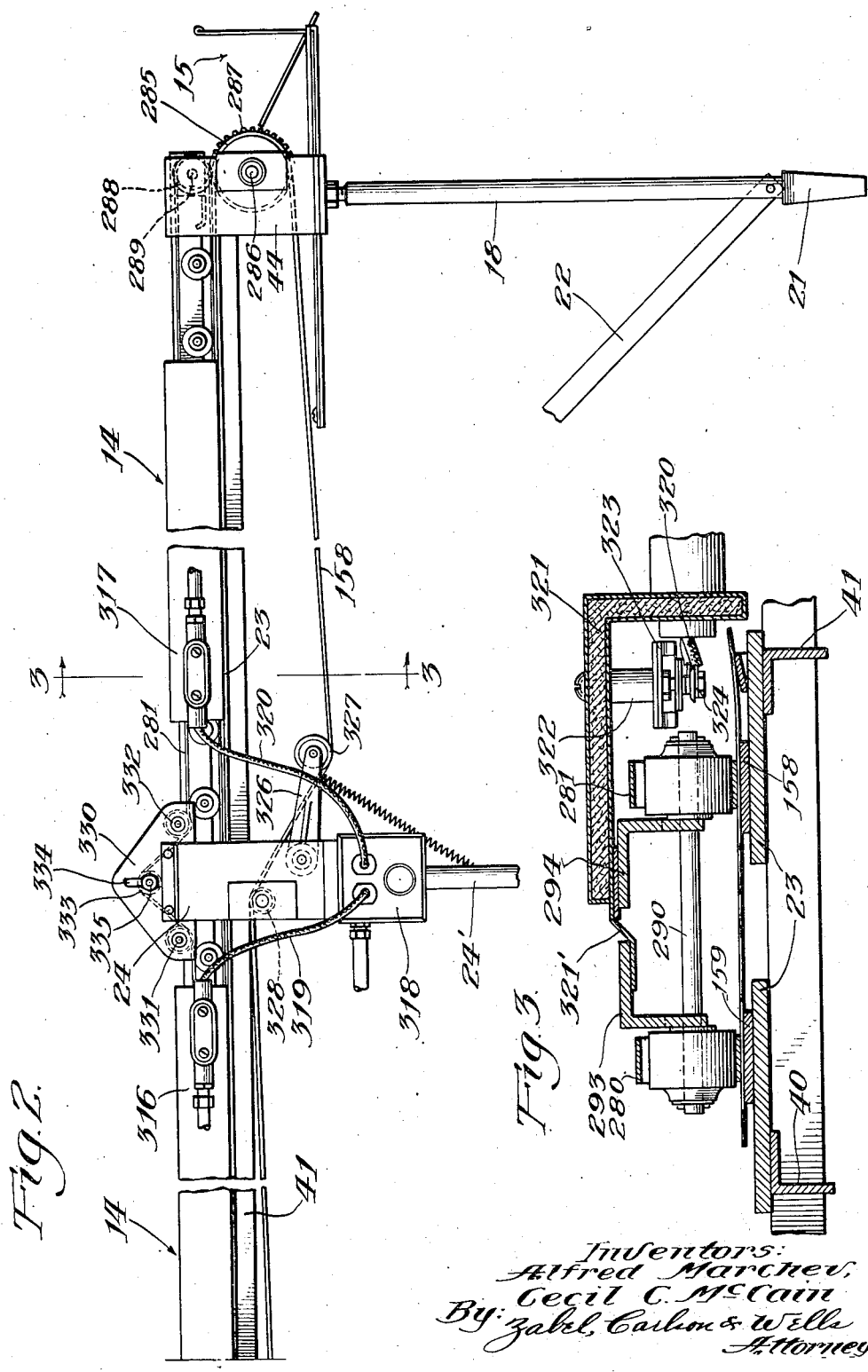

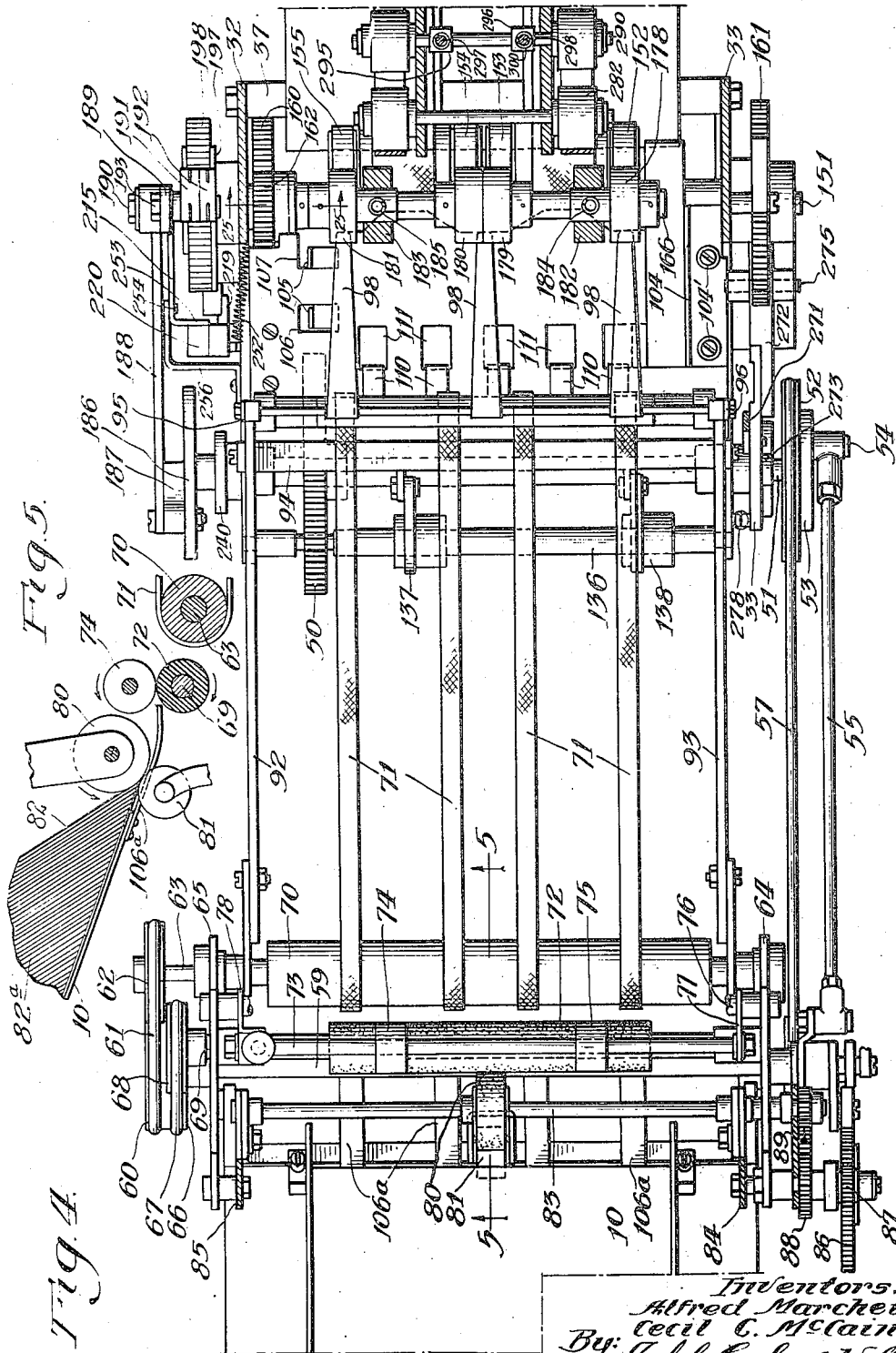

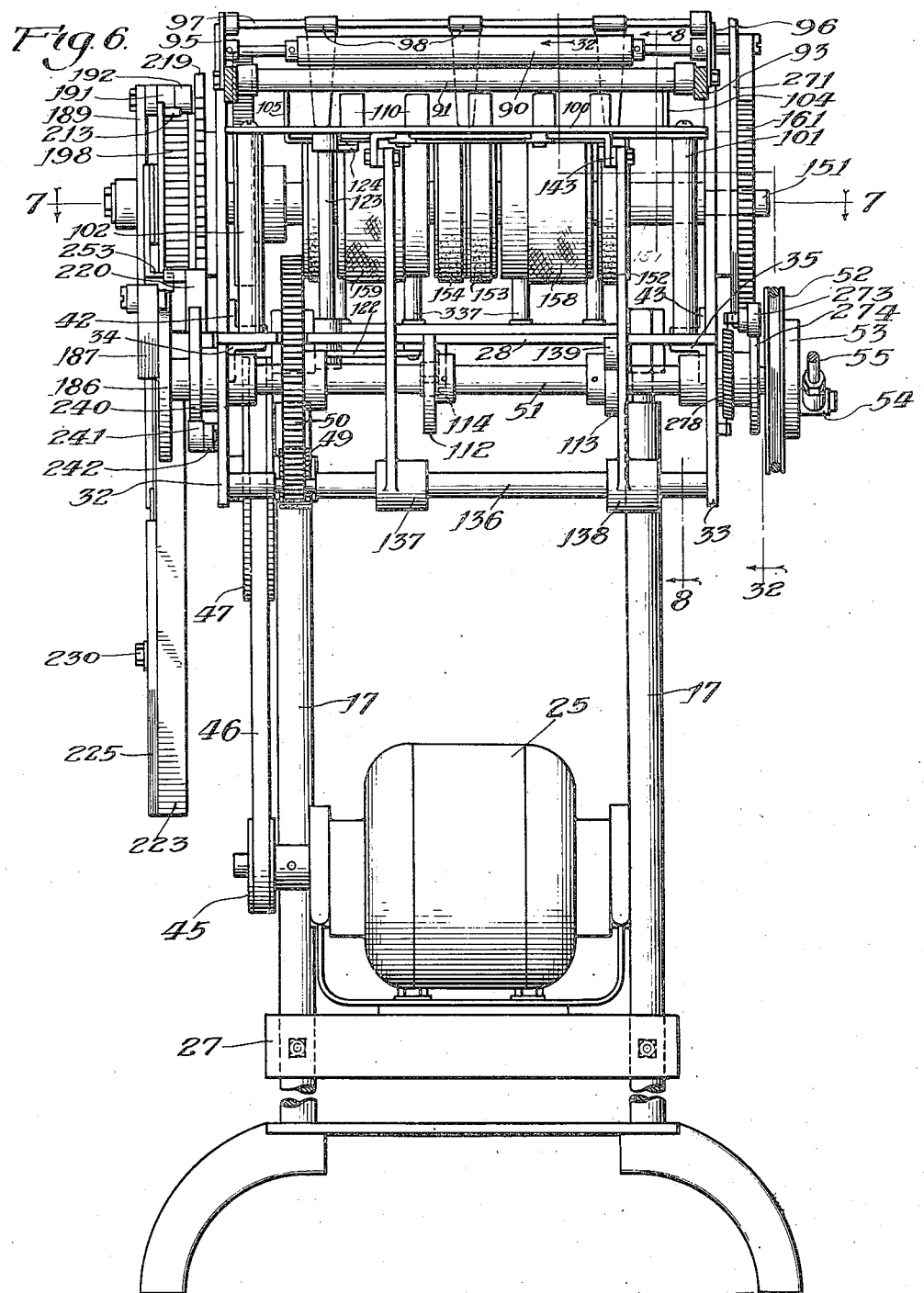

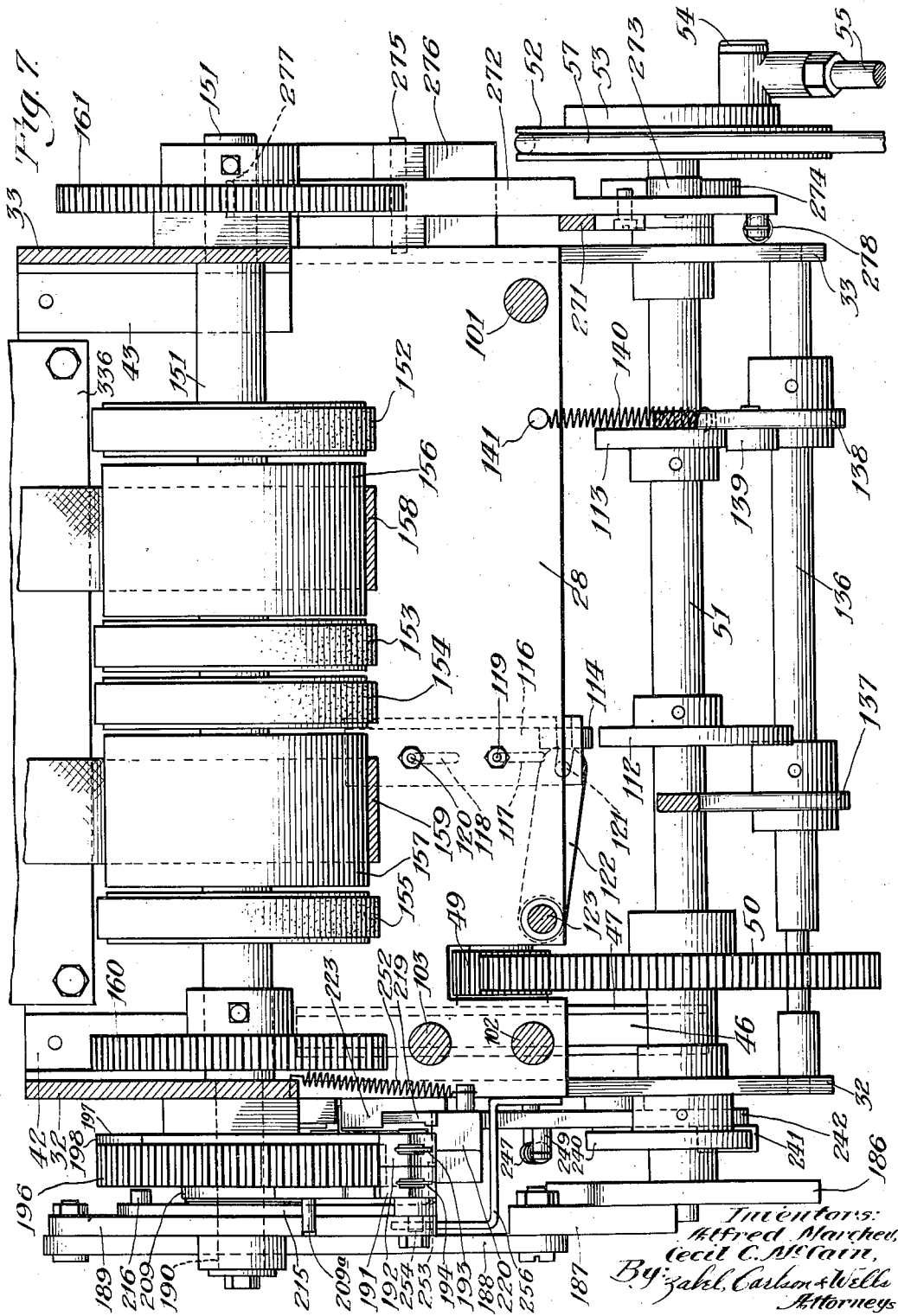

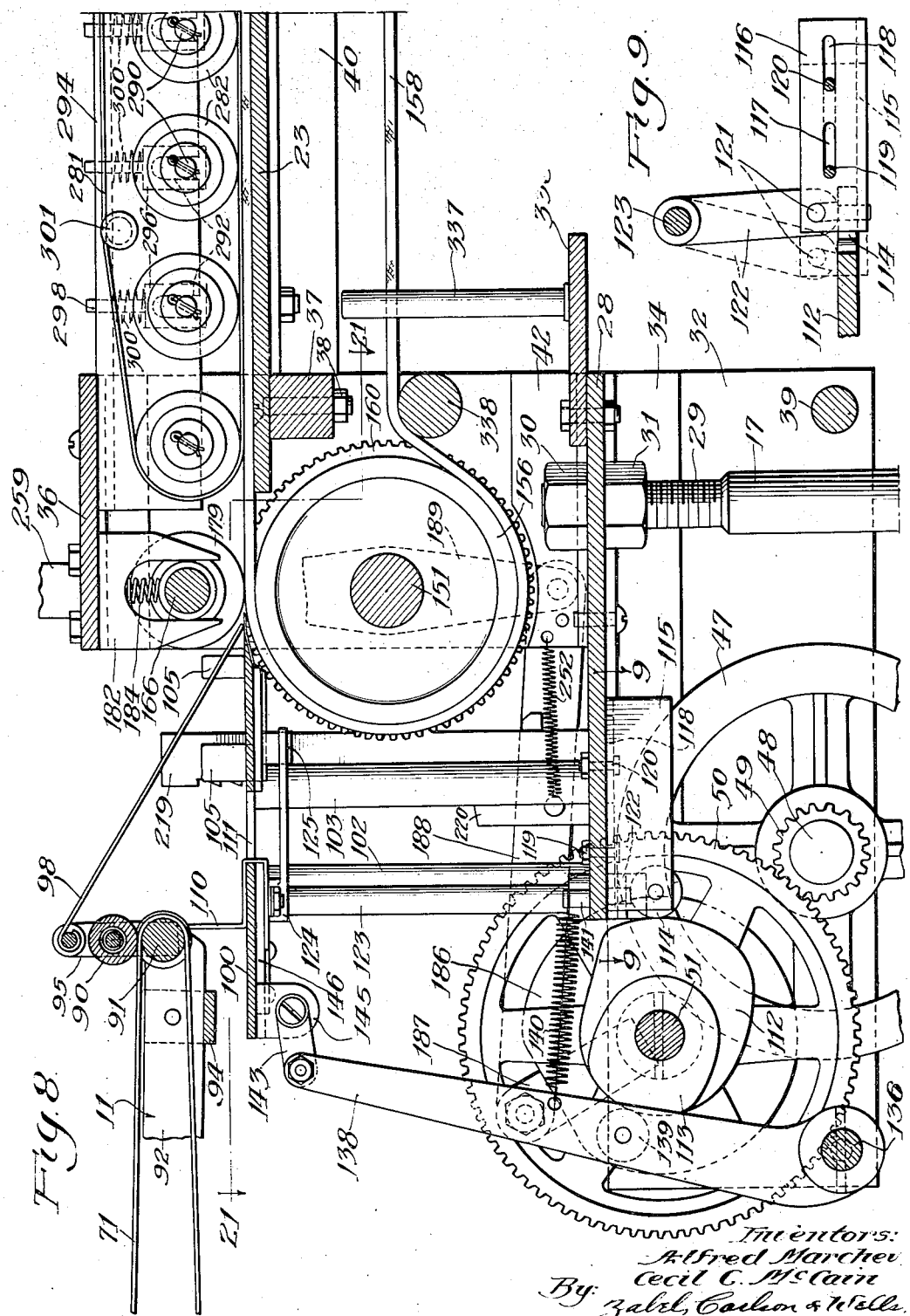

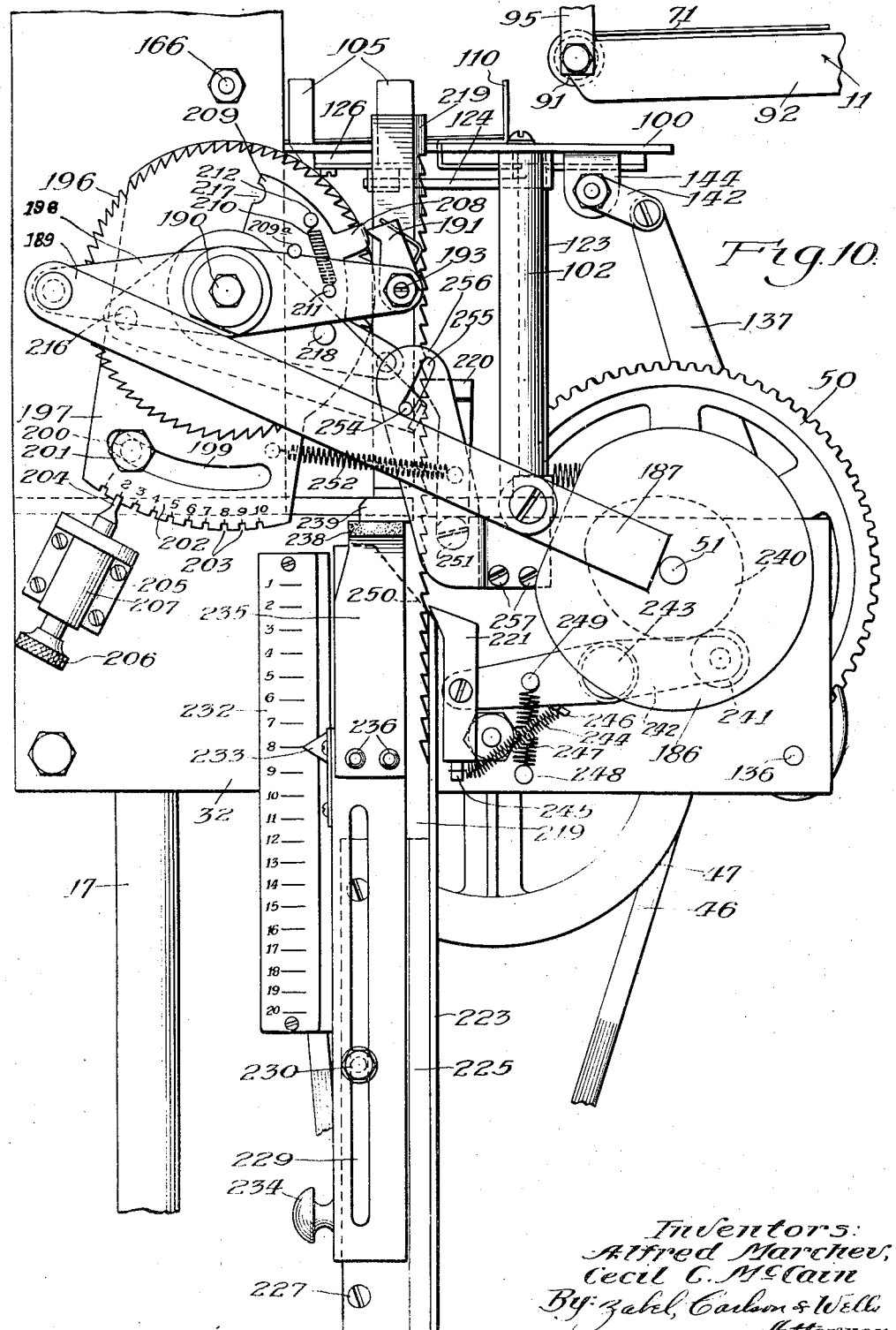

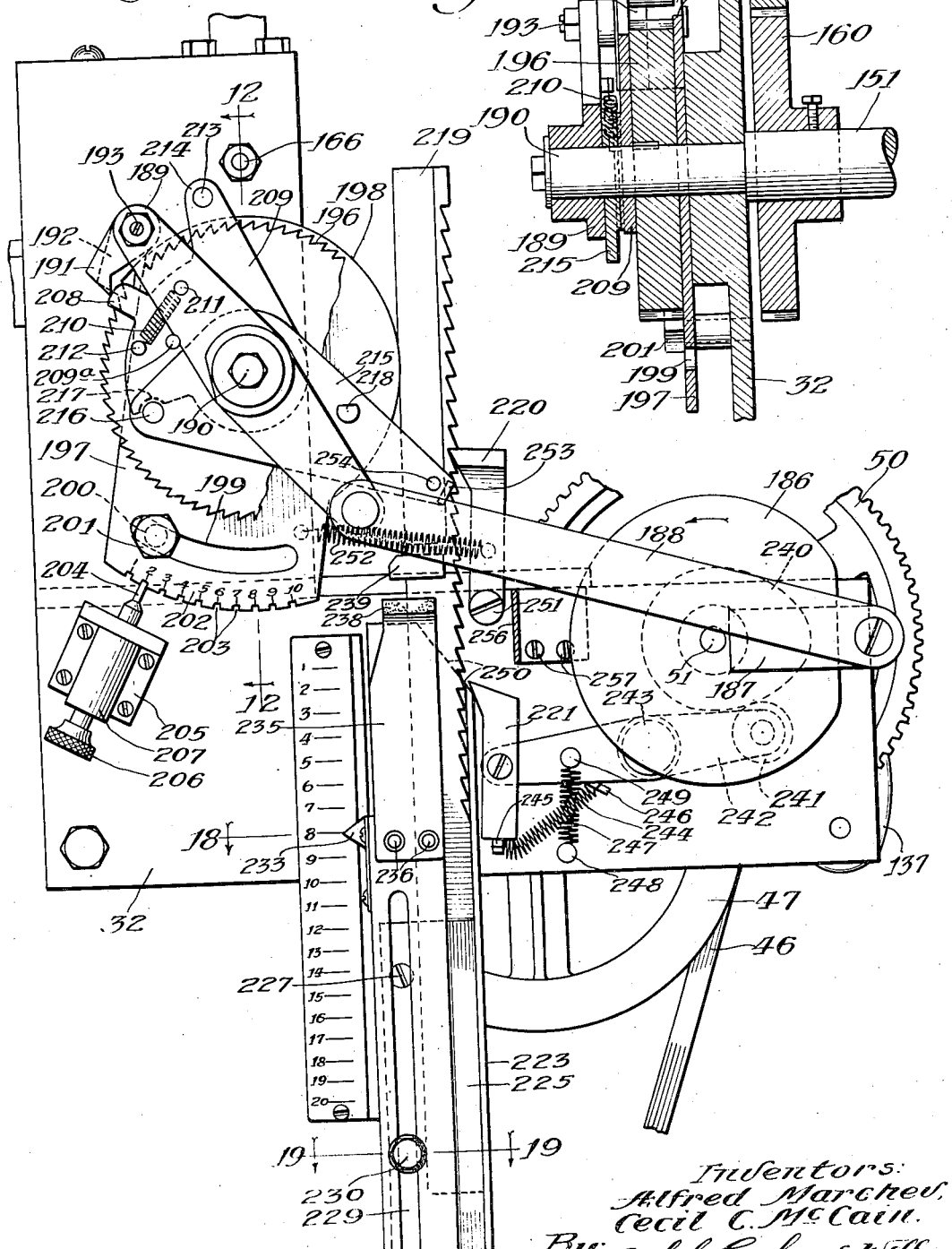

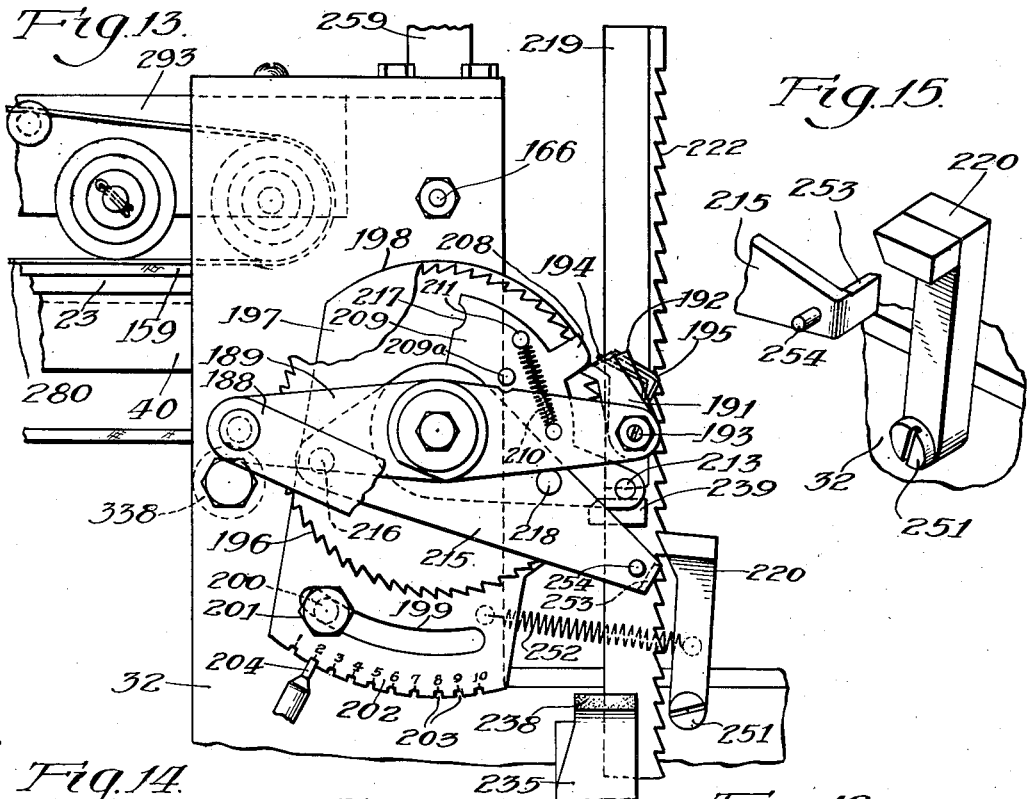
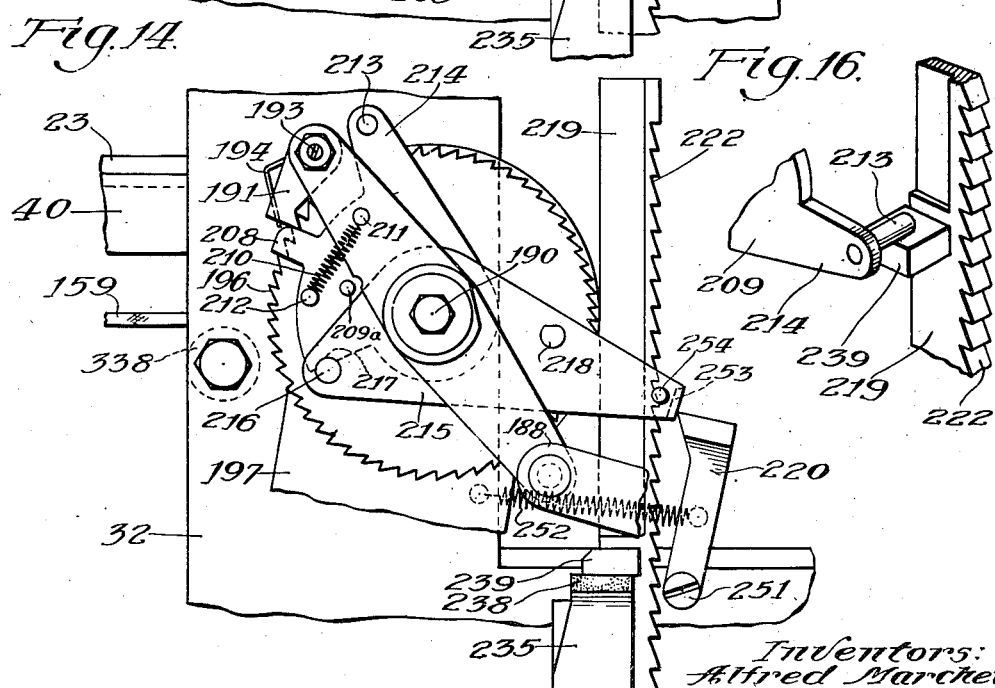

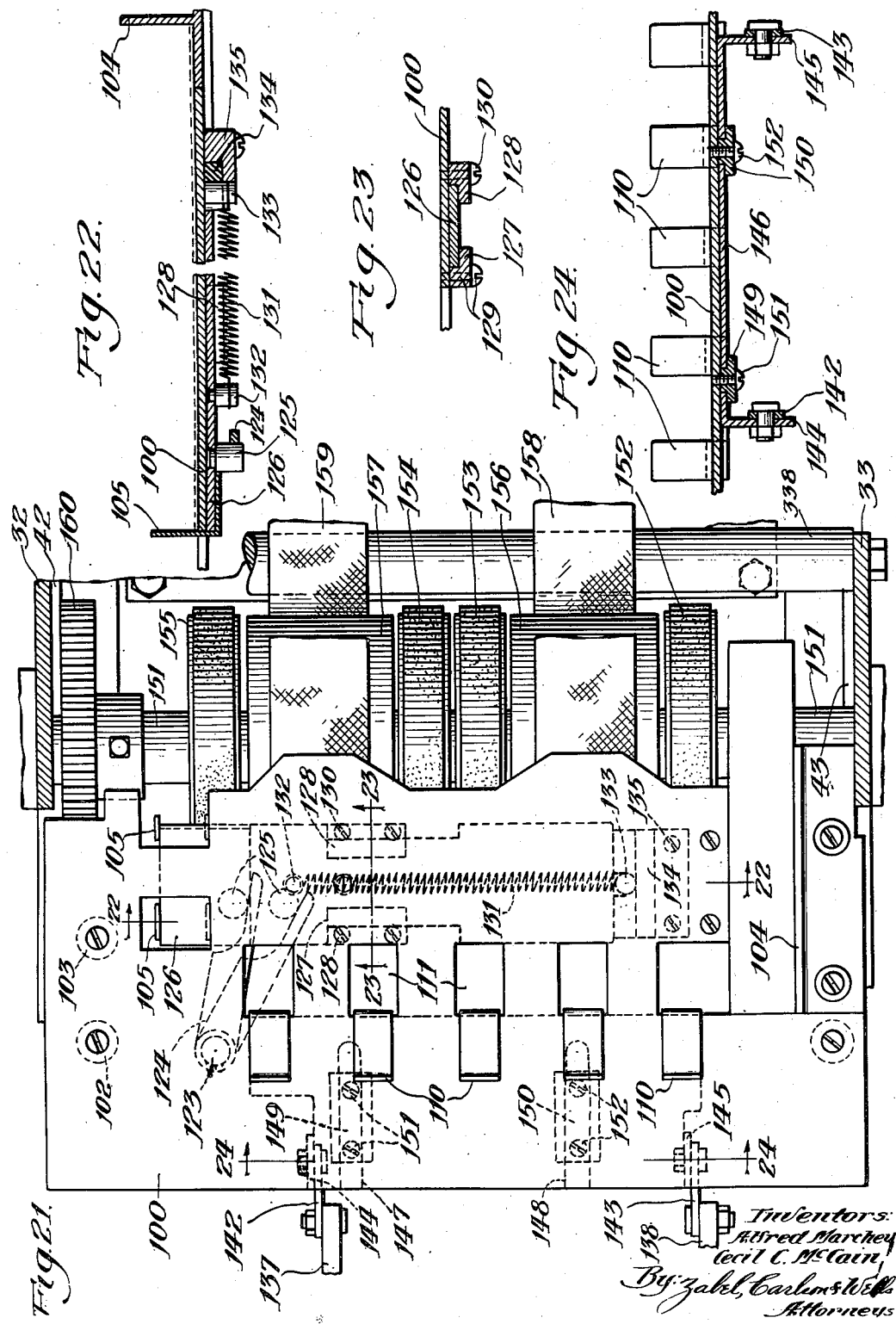

Nov. 26, 1940.　　　A. MARCHEV ET AL　　　2,222,983
SHEET ASSEMBLING MACHINE
Original Filed Jan. 30, 1937　　14 Sheets-Sheet 12
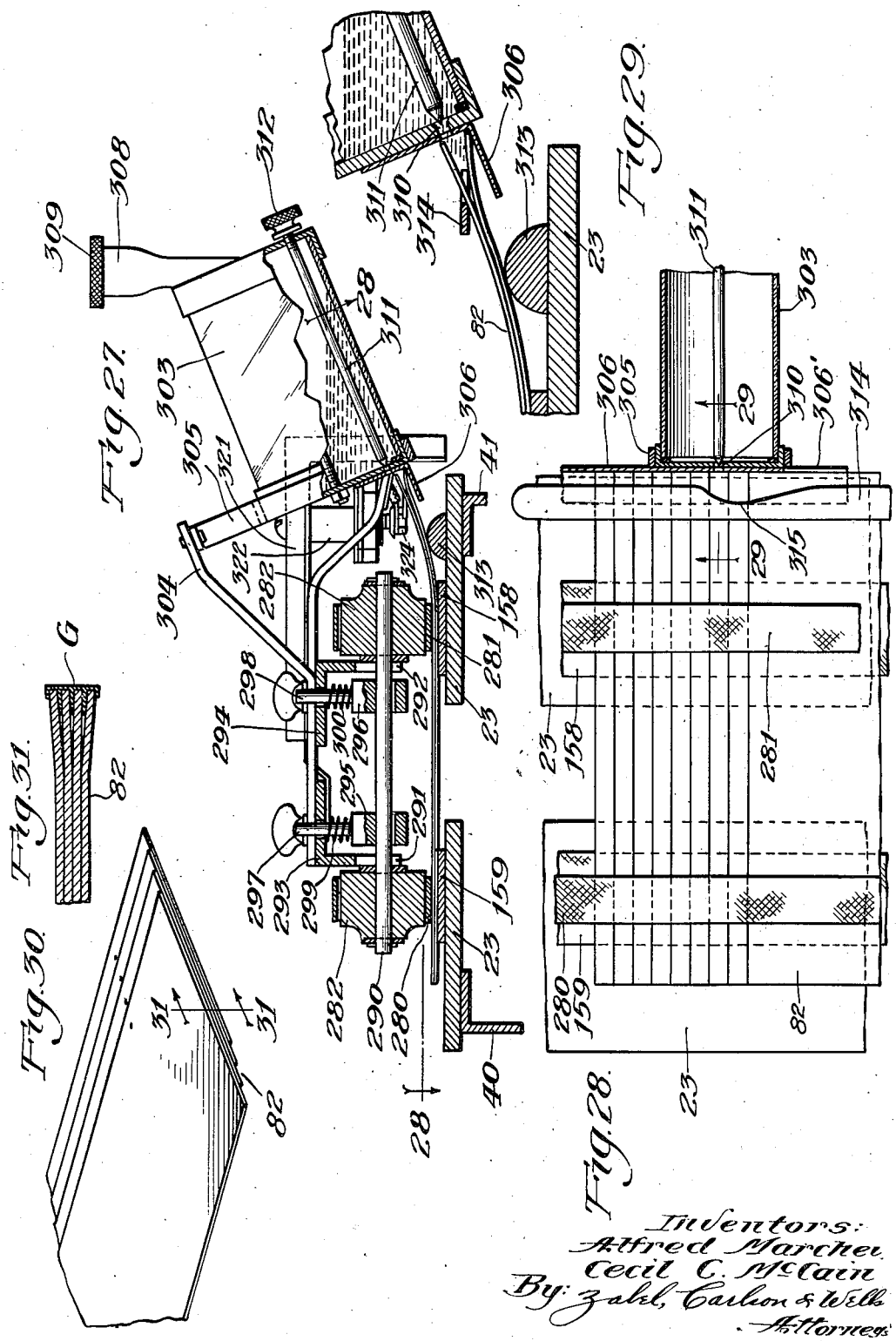
Inventors:
Alfred Marchev
Cecil C. McCain
By: Zabel, Carlson & Wells
Attorneys

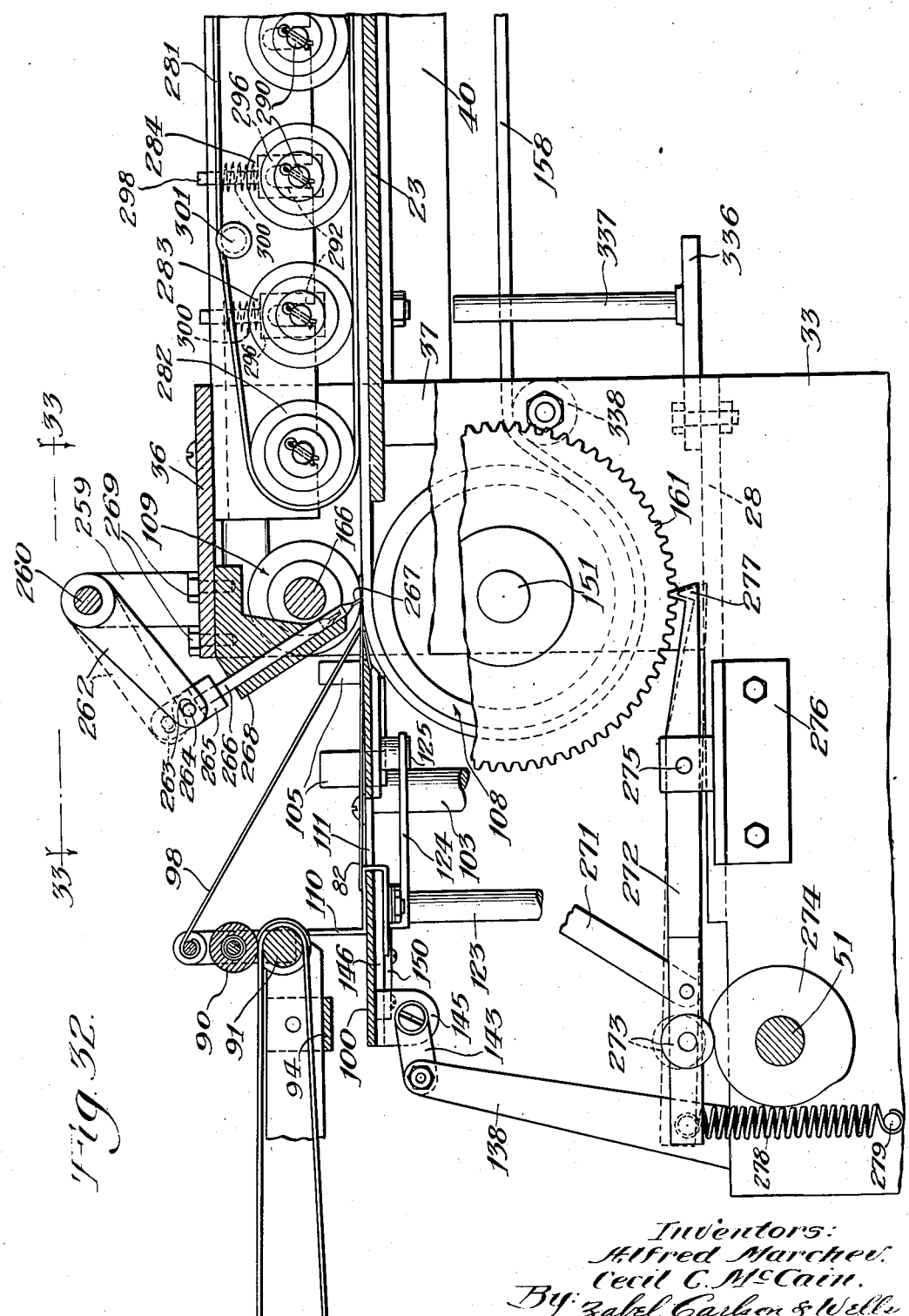

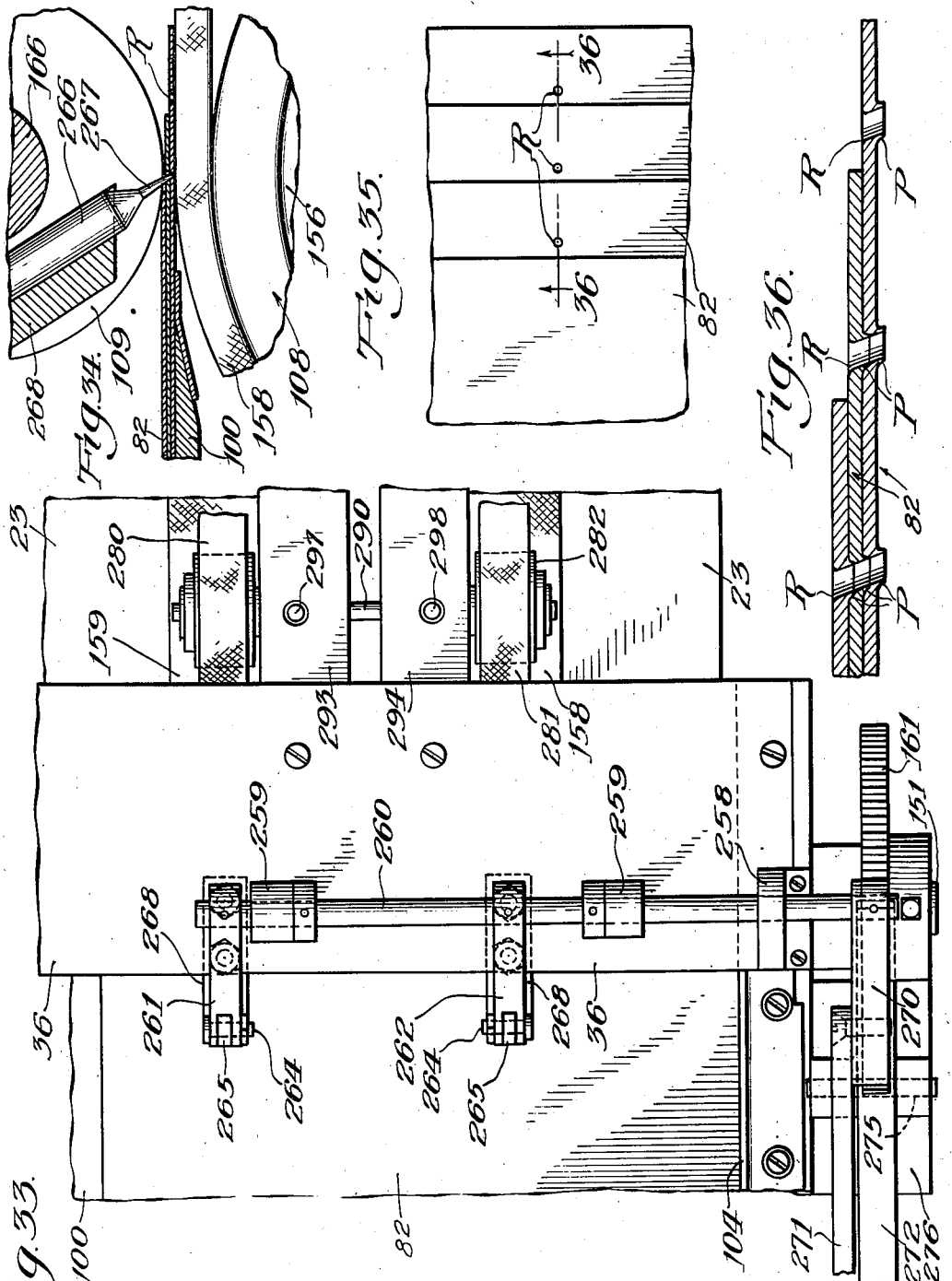

Patented Nov. 26, 1940

2,222,983

UNITED STATES PATENT OFFICE 2,222,983

SHEET ASSEMBLING MACHINE

Alfred Marchev, La Grange, and Cecil C. McCain, Glen Ellyn, Ill., assignors to Ditto, Incorporated, Chicago, Ill., a corporation of West Virginia Application January 30, 1937, Serial No. 123,176
Renewed February 3, 1940

33 Claims. (Cl. 93—1)

This invention relates to a sheet or card assembling machine which is adapted to take sheets or cards from a suitable source of supply and assemble the sheets together in regular overlapping sequence leaving a portion of each sheet exposed on each side of the assembled group. The machine is particularly useful for assembling groups of sheets with a margin of each sheet exposed to receive a legend from a master copy which has the several legends arranged thereon in uniformly spaced relationship.

One form of the invention is embodied in a machine having means for laying a plurality of sheets of paper one upon another in overlapping relationship. The sheets are individually positioned with respect to the previously laid sheets and temporarily affixed to the previously laid sheet or sheets whereby to maintain the several sheets in correct alignment while they are being more permanently attached to each other. After the several sheets are positioned and temporarily connected together, they are secured together in groups by any suitable method such as gluing. One such method of assembling sheets or cards is disclosed in the application of Charles A. Bergsten, Serial No. 98,077, for Card assemblies and method of producing them.

The machine includes means to assemble the sheets or cards in groups, each group containing a predetermined number of sheets. The several sheets of each group are secured to each other. The groups however are separate so that they may be stacked and handled in a manner similar to individual sheets.

The machine also includes means to predetermine the degree of overlapping of one sheet upon another. The machine thus is capable of producing one run of any number of groups of assembled sheets having exposed margins capable of receiving one line of imprinted information, and by a simple adjustment a second run in which the sheets have exposed margins capable of receiving two or more lines of imprinted information. The number of sheets in each individual assembly may also be varied at will.

Other objects and advantages of the invention will become apparent as the following description progresses, reference being had to the accompanying drawings wherein a preferred embodiment of the invention is shown.

In the drawings—

Fig. 1 is a side elevation of the feeding end of a machine which embodies the invention.

Fig. 2 is a side elevation of the discharge end of the improved machine, Fig. 2 being complementary to Fig. 1 so that a complete side elevation is shown in these two figures.

Fig. 3 is an enlarged transverse section taken on line 3—3 of Fig. 2.

Fig. 4 is a fragmentary plan elevation of the improved machine.

Fig. 5 is a fragmentary longitudinal section taken on line 5—5 of Fig. 4.

Fig. 6 is an enlarged transverse section taken on line 6—6 of Fig. 1.

Fig. 7 is a fragmentary plan section taken on line 7—7 of Fig. 6.

Fig. 8 is a fragmentary longitudinal section taken on line 8—8 of Fig. 6.

Fig. 9 is a fragmentary plan section taken on line 9—9 of Fig. 8.

Fig. 10 is a fragmentary side elevation looking at the machine from a direction opposite to that in which it is viewed in Fig. 1.

Fig. 11 is a view similar to Fig. 10 but showing certain parts in changed positions and showing a bracket partly in section.

Fig. 12 is a transverse vertical section taken on line 12—12 of Fig. 11.

Fig. 13 is another fragmentary side elevation showing the same mechanism as in Fig. 10 but having certain parts in changed positions and other parts broken away.

Fig. 14 is another fragmentary side elevation of the mechanism shown in Fig. 10 but showing certain parts in changed positions and other parts broken away.

Fig. 15 is a perspective view of certain mechanism shown in Figs. 13 and 14 and associated with the feeding mechanism.

Fig. 16 is a perspective view of certain mechanism shown in Figs. 13 and 14 and associated with the feeding mechanism.

Fig. 17 is a view showing part of the mechanism shown in Fig. 10 viewed from the same direction but illustrating certain details of the invention not apparent in Fig. 10.

Fig. 18 is a plan section taken on line 18—18 of Fig. 11.

Fig. 19 is a plan section taken on line 19—19 of Fig. 11.

Fig 20 is a perspective view of a combined stop and indicating device forming part of the improved machine.

Fig. 21 is a plan section taken on line 21—21 of Fig. 8.

Fig. 22 is a transverse vertical section taken on line 22—22 of Fig. 21.

Fig. 23 is a fragmentary longitudinal section taken on line 23—23 of Fig. 21.

Fig. 24 is a transverse vertical section taken on line 24—24 of Fig. 21.

Fig. 25 is a fragmentary enlarged section taken on line 25—25 of Fig. 4.

Fig. 26 is a section taken on line 26—26 of Fig. 25.

Fig. 27 is an enlarged transverse section taken on line 27—27 of Fig. 1.

Fig. 28 is a plan section taken on line 28—28 of Fig. 27.

Fig. 29 is an enlarged section taken substantially on the same line as Fig. 27 and illustrating the details of the mechanism for applying the adhesive to the cards.

Fig. 30 is a perspective view of a complete assembly of cards as they are discharged from the machine, and Fig. 31 is an enlarged section taken on line 31—31 of Fig. 30.

Fig. 32 is an enlarged sectional view taken on the line 32—32 of Fig. 6.

Fig. 33 is a fragmentary plan view taken on the line 33—33 of Fig. 32, certain parts being left out for the sake of clearness.

Fig. 34 is an enlarged fragmentary sectional view taken on the same line as Fig. 32.

Fig. 35 is a fragmentary plan view of a series of sheets temporarily secured together.

Fig. 36 is a sectional view on the line 36—36 of Fig. 35.

While it has been pointed out above that the assemblies of sheets or cards are particularly adapted to be employed in connection with a master copy or the equivalent, it is to be understood that the exposed strips of the cards or sheets may be printed, written, or typewritten upon as will be readily understood. In the specification hereinafter, we will refer to the elements that are assembled in overlapping relationship as sheets with the understanding that the term as employed includes cards and is not limited to the material of which the sheets or cards may be made.

Referring now to the drawings wherein a preferred embodiment of the invention is shown, the machine as shown comprises a mechanism whereby sheets arranged on edge are placed upon a feeding table 10 and fed intermittently to a conveyor 11 which delivers the sheets to an assembling and temporary securing mechanism 12. The assembled sheets are delivered from the mechanism 12 to a gluing mechanism 13 and fed by means of suitable conveyors to a drying mechanism 14. From the drying mechanism 14, the sheets are conveyed to a receiver 15. The several mechanisms just described are supported by standards 16, 17, and 18. A rod 19 connects the standards 16 and 17. There are two of the standards 16 and two each of the standards 17 and 18. The standards 17 are supported by an inverted U-shaped base 20, and the standards 18 are supported by an inverted U-shaped base 21. A brace 22 is used to brace the standards 18 and connects to a bed 23 which supports the conveying mechanism. The heating mechanism 14 is in two sections on opposite sides of a belt tightening frame which is supported by suitable standards 24' which are carried upon a base, not shown, which is similar to the base members 20 and 21. The power for operating the machine is obtained from a motor 25 which is supported by a plate 26. The plate 26 is mounted upon a cross bar 27 which in turn is adjustably secured upon the standards 17.

Referring now to Figs. 6 to 8 in particular, the standards 17 are adapted to support a bed plate 28. The upper ends of the standards 17 are screw threaded as indicated at 29, and the bed plate 28 is apertured to receive the screw threaded portions 29 of the standards 17. The bed plate 28 is positioned upon the standards 17 by nuts 30 and 31 between which the bed plate is clamped. A pair of side plates 32 and 33 are secured to the bed plate 28 by angle irons 34 and 35. The plates 32 and 33 are connected at the top by a plate 36. A cross bar 37, shown best in Figs. 4 and 8, also connects the side plates 32 and 33 and serves as the support for the forward end of the conveyor bed 23. The conveyor bed 23 is secured to the cross bar 37 by suitable screw bolts 38. A tie rod 39 is also used at the lower rear corners of the side plates 32 and 33 for securing the plates together. The conveyor bed 23 has angle irons 40 and 41 extending lengthwise thereof for the purpose of reenforcing the bed. Also, the mounting of the side plates 32 and 33 upon the bed plate 28 is reenforced by angle irons 42 and 43, shown best in Figs. 6 and 21. The conveyor bed 23 is also supported at the delivery end of the machine by the standards 18 as shown in Fig. 2, a suitable frame 44 being mounted at the top of the standards 18 and providing the necessary support for the rear end of the bed plate and the conveyor mechanism as well as the sheet receiving means 15.

The standards 16 support a sheet feeding mechanism 10A which is adapted to intermittently feed individual sheets from the feed table 10 to the conveyor 11. The intermittent feed mechanism is shown best in Figs. 1, 4, and 5. This mechanism is driven from the motor 25 in the following manner:

The motor 25 has a pulley 45 for a belt 46 which in turn drives a pulley 47 on a drive shaft 48, the drive shaft 48 being carried by the side frame 32. This drive shaft carries a pinion 49 meshing with a gear 50 which is fixed upon a shaft 51 that is journalled in the side frames 32 and 33. The shaft 51 carries a pulley 52 and a disk 53. The disk 53 has a pin 54 eccentrically mounted thereon. A connecting rod 55 connects the pin 54 to a lever 56 of the intermittent sheet feed mechanism 10A. The pulley 52 drives a belt 57 which drives a pulley 58 on a shaft 59 journalled in the standards 16. This shaft 59 carries a pulley 60 which drives a belt 61 that in turn drives a pulley 62 on a shaft 63 rotatably journalled in side frames 64 and 65. The shaft 59 also carries a pulley 66 which drives a belt 67. The belt 67 drives a pulley 68 on a shaft 69. The shaft 63 carries a roller 70 which drives a series of conveyor belts or tapes 71. Four spaced tapes 71 are shown. The shaft 69 carries a rubber roller 72. A shaft 73 carries a pair of spaced rubber rollers 74 and 75 which cooperate with the driven roller 72 to advance sheets to the conveyor tapes 71. The shaft 73 is supported from a tie rod 76 which connects the side frames 64 and 65. The supports for the shaft 73 comprise a pair of arms 77 and 78 pivoted on the tie rod 76 and carrying the shaft 73.

The sheets on table 10 are fed intermittently to the rollers 72 by an intermittently rotated feed roller 80 which advances them along a guide lip 106a. The roller 80 cooperates with a pressure roller 81 to draw a sheet 82 from a stack 82a on the table 10. The roller 80 is carried on a shaft 83 journalled in a pair of arms 84 and 85 which are mounted on the side frames 64 and 65.

The shaft 83 and the roller 80 are driven intermittently from the lever 56 by an intermittent drive mechanism including a rack 86 and gears 87, 88, and 89. All of the details of this mechanism are not shown because the intermittent feed mechanism enters into the present invention only as part of the general combination and is not new per se. The specific details of this mechanism are, therefore, not important. Also, it is to be understood that any equivalent mechanism for supplying sheets may be substituted for that shown.

The conveyor tapes carry the fed sheets to a pair of rollers 90 and 91 at the right hand end of the conveyor 11. The conveyor 11 has side frames 92 and 93 (see Figs. 4 and 8) supported by the frame of the intermittent feed mechanism. The side frames 92 and 93 are connected by a cross bar 94 adjacent the rollers 90 and 91. Uprights 95 and 96 are mounted on the side frames 92 and 93. The roller 90 is carried by the uprights 95 and 96, and the roller 91 is carried by the side frames 92 and 93. The uprights 95 and 96 also are connected at the top by a rod 97. The rod 97 supports a plurality of guide fingers 98 which are bent around the rod 97 (see Fig. 8).

Sheets leaving the conveyor 11 through the rollers 90 and 91 drop upon a positioning table 100. The table 100 is supported from the bed plate 28 by three posts 101, 102, and 103 (see Figs. 6 and 7). A margin bar 104 is fastened to the table 100 by screws 104' and extends parallel to the line of travel of sheets advanced to the table 100. The sheets are pushed against the margin bar 104 after they are fed to the table 100 by the conveyor 11.

The means for moving the sheets against the margin bar 104 comprises a plurality of fingers 105 which project up through suitable openings 106 and 107 in the table 100. The sheets are positioned in their direction of travel by being moved forward until the forward edges thereof are positioned in the bight of two sets of feeding and conveyor driving rollers 108 and 109. The means for pushing the sheets forward to the rollers 108 and 109 comprises a plurality of fingers 110 projecting up through suitable openings 111 in the table 100. The rollers 108 and 109 and the fingers 105 and 110 are intermittently driven in proper timed relation to each other from the motor 25 so that, after a sheet falls upon the table 100 from the conveyor 11, it is first moved laterally against the margin bar 104 by means of the fingers 105 and is then advanced to the rollers 108 and 109 by means of the fingers 110, the rollers 108 and 109 being stationary during this positioning operation.

When a sheet has been positioned in the fashion just described, the rollers 108 and 109 are then caused to rotate so as to advance the positioned sheet a predetermined amount after which they come to rest in order that a new sheet may be overlapped with the first sheet by positioning it in the same manner as the first sheet was positioned. This operation is continued until a predetermined group of sheets has been assembled after which this group of sheets is fed forward from the rollers 108 and 109.

Referring now to the operating mechanism for the fingers 105 and 110 and the rollers 108 and 109, it will be recalled that the motor 25 is connected by means of the pulleys 45 and 47 and the belt 46 to the shaft 48 which carries the pinion 49 meshing with the gear 50 on the shaft 51. The shaft 51 carries a cam 112 which is adapted to actuate the fingers 105, and a cam 113 which is adapted to actuate the fingers 110. As shown best in Figs. 8 and 9, the cam 112 engages a roller 114 which is carried by a depending flange 115 of a plate 116 which is slidably mounted beneath the bed plate 28 of the machine. The plate 116 has a plurality of elongated slots 117 and 118 which receive headed bolts 119 and 120 for slidably mounting the plate 116 upon the bed plate 28. The plate 116 has a pin 121 depending therefrom, and this pin is engaged between the bifurcations at one end of an arm 122, the other end of the arm 122 being fixed upon a vertically running shaft 123 which projects upwardly through the bed plate 28 and is journalled at its upper end in the table 100.

Directly beneath the table 100, an arm 124 is secured upon the shaft 123. The arm 124 engages a pin 125 which depends from a plate 126 slidably mounted on the lower surface of the table 100. The plate 126 is supported and guided by a pair of bars 127 and 128 secured to the table 100 by suitable screws such as 129 and 130. The plate 126 is reduced in width between the bars 127 and 128 as shown most clearly in Figs. 21 and 23. The plate 126 carries the fingers 105 and is spring pressed toward the margin bar 104 by a spring 131, one end of which is secured to a pin 132 on the plate 126, and the other end of which is secured to a pin 133 depending from the table 100.

For the purpose of eliminating shock and reducing the noise of operation, a rubber block 134 is secured by means of a bar 135 to the lower surface of the table 100 in position to be engaged by the end of the plate 126 as it moves toward the margin bar 104.

In operation, the arm 124 opposes the pull of the spring 131 which tends to move the fingers 105 toward the margin bar 104. As the cam 112 is shown in Fig. 8, it is in position to hold the fingers 105 in their position most remote from the margin bar 104, and, in the position shown in Fig. 7, the cam 112 is in the position where it permits the spring 131 to move the fingers 105 and the plate 126 toward the margin bar 104. The spirng 131 is sufficiently strong to carry the arm 124 along with the plate 126 thereby rotating the upright shaft 123 and moving the bifurcated arm 122 from the full line position shown in Fig. 9 to the dotted line position shown in Fig. 9, or in other words to the position shown in Fig. 7.

The mechanism whereby the cam 113 actuates the fingers 110 comprises a rock shaft 136 carried by the side frames 32 and 33 and having fixed thereon a pair of arms 137 and 138. The arm 138 carries a roller 139 which rides on the surface of the cam 113. A spring 140 has one end secured to the arm 138, and the other end secured to a pin 141 on the bed plate 28, and is under tension so as to hold the roller 139 against the cam 113 at all times. At the upper end thereof, the arms 137 and 138 are connected by a pair of links 142 and 143 to a pair of depending lugs 144 and 145 of a plate 146. The plate 146 is slotted at 147 and 148 to receive a pair of guiding and supporting bars 149 and 150, these bars being secured to the undersurface of the table 100 so as to slidably mount the plate 146 on the table 100. Suitable screws 151 and 152 secure the bars 149 and 150 in place. The fingers 110 are strips welded or otherwise secured on the plate 146, doubled back upon themselves, and passed through the openings 111 in the table 100. The cam 113 in the position shown in Fig. 8 has retracted the fingers 110 against the tension of the spring 140 so that the fingers 110 are back ready to receive a sheet between them and the rollers 108 and 109. As the cam 113 rotates, the roller 139 will be permitted to move closer to the axis of the cam thereby permitting the spring 140 to draw the arms 137 and 138 toward the body plate 28 and advance the fingers 110 toward rollers 108 and 109.

Referring now to the rollers 108 and 109 and the mechanism for operating them, the rollers 108 are carried by a main shaft 151 which is journalled in the side frames 32 and 33 and are adapted to be intermittently rotated in timed relation to the other mechanism in a manner which will be presently described. The rollers 108 are made up of a plurality of rollers some of which act as direct feed rollers and others of which act as pulleys for conveyor belts or tapes to carry the assembled paper sheets on through the machine. As illustrated best in Figs. 6, 7, and 21, the rollers 108 comprise spaced rubber rollers 152, 153, 154, and 155, each fixed to the shaft 151. A steel pulley or roller 156 is interposed between the rubber rollers 152 and 153, and a steel roller 157 is interposed between the rubber rollers 154 and 155. The rollers 156 and 157 are, of course, fixed to the shaft 151. A pair of conveyor belts or tapes 158 and 159 extend around the rollers 156 and 157, respectively.

A gear wheel 160 is fixed on the shaft 151 just inside the frame 32. A gear wheel 161 is fixed on the shaft 151 outside the frame 33. The gear wheel 160 meshes with a smaller gear wheel 162 journalled on a stub shaft 163. The stub shaft 163 is provided with a reduced portion 164 which extends through the side frame 32 and is screw threaded to receive a nut 165. The gear wheel 162 is coupled by an adjustable coupling to a shaft 166. As shown best in Figs. 25 and 26, the adjustable coupling comprises a pair of pins 167 and 168 on the gear wheel 162, a disk 169 having a slot 170 receiving the pins 167 and 168 and having a slot 171 at right angles to slot 170 in the opposite side of said disk from the slot 170, a flange 172 formed on a collar 173 fixed on the shaft 166 and having a pair of pins 174 and 175 riding in the slot 171. The several pins are provided with bearing sleeves 176 and 177 (shown in Fig. 26 on pins 167 and 168). This coupling provides for limited off center movement of the shaft 166 with respect to the gear 162.

The shaft 166 carries four rollers 178, 179, 180, and 181 vertically aligned with the rubber rollers 152, 153, 154, and 155 and cooperate with them to advance sheets and to act as a stop for the sheets. The shaft 166 is guided by a pair of bifurcated guide blocks 182 and 183 which are bolted to the top plate 36. A spring 184 presses on the shaft 166 at the block 182, and a spring 185 presses on the shaft 166 at the block 183. The shaft 166 moves vertically as the thickness of paper increases between the rollers 152, 153, 154, and 155 on the lower side and the rollers 178, 179, 180, and 181 carried by the shaft 166. This is best shown by Fig. 34. The adjustable coupling between the shaft 166 and the gear 162 permits this vertical movement without interfering with the rotation of the shaft 166.

The mechanism by which the gears 160 and 162 are driven from the motor 25 is shown generally in Figs. 4, 6, and 7, and more in detail in Figs. 10 to 20 inclusive. The shaft 51, which is continuously driven by the motor 25, carries a disk 186 upon which an arm 187 is fixed. The arm 187 is connected by a link 188 to one end of a lever 189.

The lever 189 is pivoted upon an extension 190 of the main shaft 151 so as to be rocked about the shaft as an axis by the rotation of the disk 186. Referring now to Figs. 10, 11, and 12, in particular, the lever 189 carries a pair of pawls 191 and 192, these pawls being arranged side by side on a stub shaft 193 and spring pressed by springs 194 and 195. The shaft 151 also carries a ratchet wheel 196 with which the pawls 191 and 192 engage. The ratchet wheel 196 is keyed to the shaft 151.

Means are provided whereby the amount of rotation of the ratchet wheel 196 for each oscillation of the pawl lever 189 can be controlled so as to give a step by step rotation of the shaft 151 and the rollers carried by this shaft and by the shaft 166. For this purpose, a plate 197 is mounted between the ratchet wheel 196 and the side frame 32. The plate 197 has a camming surface 198 which projects beyond the teeth of the ratchet wheel 196 a sufficient amount to prevent the pawl 192 from engaging the ratchet wheel until it rides over the plate 197. For example, in Fig. 11 the pawl 192 has gone beyond the cam surface 198 of the plate 197 and has dropped down into engagement with the teeth of the ratchet wheel 196. In Fig. 13, the pawl 192 is riding on the camming surface 198 and, therefore, does not engage the ratchet wheel. The plate 197 is slotted at 199 to receive a stud 200 which carries a nut 201 for fastening the plate in any adjusted position.

A scale is formed on the plate 197 at 202, and the edge of the plate is notched at 203 to receive a pin 204 slidably mounted in a bracket 205 on the side frame 32. The pin 204 has a knurled head 206 and may be suitably spring pressed by a spring (not shown) in a barrel 207 so as to be urged into one of the notches 203 as will be readily understood. When the plate 197 is set, as shown in Figs. 10 and 11, one rotation of the disk 186 will advance the ratchet wheel only the distance across two teeth of the ratchet wheel, and this will, of course, rotate the shafts 151 and 166 a corresponding amount, thereby providing spacing for two lines of typing on the overlapping edges of the sheets. For a greater rotation of the ratchet wheel for each rotation of the disk 186, the plate 197 is adjusted about the extension 190 of the shaft 151.

Means are provided whereby a number of sheets may be grouped together in overlapped relation as the shafts 151 and 166 are advanced step by step. Within each group, however, the amount of advance of the shaft 151 determines the width of margin exposed for each sheet because the machine is so timed that the sheets are fed and positioned on the table 100 while the shafts 151 and 166 are stationary and the advancement of the sheets by the rollers on the shafts 151 and 166 occurs while there is no sheet being positioned on the table 100.

In order that the groups of sheets assembled in overlapped relationship may be separated at the time they leave the rollers on the shafts 151 and 166 and advance under the influence of the tapes 158 and 159, the mechanism is so arranged that at predetermined intervals the ratchet wheel 196 is given a rotational movement which corresponds to the full angular movement of the lever 189. The mechanism whereby this movement takes place is shown most clearly in Figs. 10 to 20 inclusive.

It will be noted that the pawl 191 in Figs. 10 and 11 is shown as resting upon a projection 208 which is formed upon a plate 209 that is pivoted upon the extension shaft 190 and is connected by means of a spring 210 and pins 211 and 212 on the lever 189 and the plate 209, respectively, to the lever 189. The plate 209 also carries a pin 213 on a radially projecting portion 214 thereof. The spring 210 is under tension so as to normally hold the plate 209 and the lever 189 in the relative positions shown in Figs. 10 and 11 where a pin 209A on the plate 209 engages the lever 189. A third plate 215 is loose on the shaft extension 190 and carries a pin 216 which projects toward the plate 209 so as to be engaged by a portion 217 of the plate 209 at the limit of motion. The plate 215 also carries a pin 218 which is on the side toward the lever 189 and engages the lever 189 when the parts are in the position shown in Fig. 10.

The plates 209 and 215 with the parts thereof just described cooperate with a vertical bar 219 and a pair of pawls 220 and 221 to control the number of sheets that are placed in any group before the shaft 151 is actuated to advance the assembled group out of the way of the next succeeding group. The bar 219 has ratchet teeth 222 thereon engaged with the pawls 220 and 221. The bar 219 is slidable vertically on a guide member 223 that is mounted upon the side frame 32. The guide member 223 has a recess 224 in the side thereof in which the bar 219 is free to slide vertically. A block 225 also fits in the recess 224 and is secured to the member 223 by screws 227. The member 223 provides a vertical guide also for an adjustable member 228 which is used to determine the number of sheets that would be assembled in any particular group.

The member 228 is in the form of an angle iron having a vertically running slot 229 therein, and a bolt 230 is screw threaded into the member 223 to provide a guide and locking member whereby the member 228 can be adjusted vertically on the member 223 and secured in any adjusted position by tightening the bolt 230. A washer 231 is interposed between the head of the bolt 230 and the member 228. An indicating plate 232 is mounted on the side frame 32 alongside the member 223, and a pointer 233 is secured on the member 228 to cooperate with the indicating plate 232 as will be readily understood. A handle 234 is provided adjacent the lower end of the member 228 for raising and lowering it. At the upper end, the member 228 is provided with a bar 235 which is riveted thereto by rivets 236 and which is turned toward the ratchet bar 219 at its upper end as indicated at 237. A rubber bumper 238 is secured to the inturned portion 237 of the bar 235. The ratchet bar 219 also is provided with a bumper 239 which is adapted to engage the bumper 238 and to limit the downward movement of the bar 219.

The position of the bar 219 when it is stopped by the engagement of the bumpers 238 and 239 determines the number of sheets which will be assembled in any particular group, as will be explained more fully hereinafter. Therefore, by adjusting the member 228 vertically with respect to the guide member 223, the operator can set the machine so as to place the desired number of sheets in the assembled groups. Assuming that this adjustment has been made, the mechanism by which the bar 219 is caused to control a number of sheets in a group will now be described.

The shaft 51 carries a cam 240 which is between the disk 186 and the frame 32 of the machine. The cam 240 engages a roller 241 on a lever 242 which is pivoted upon a stud 243 mounted in the side frame 32. The lever 242 carries the pawl 221 so that, as the cam 240 rotates, the pawl 221 is moved up and down. A spring 244 connects the lower end of the pawl 221 to the lever 242, a projection 245 being provided on the lower end of the pawl, and a projection 246 being provided on the lever 242 for this purpose. The roller 241 is held against the cam 240 by a spring 247 which has one end secured to a pin 248 on the frame 32 and the other end secured to a pin 249 on the lever 242. The pawl 221 rides upon the edge of the member 223 which is bevelled, as shown at 250 at the top, so as to permit the pawl to engage the teeth on the bar 219 and raise the bar the distance between successive teeth for each rotation of the cam 240. As the bar 219 is raised, the pawl 220, which is a holding pawl pivoted by means of a pin 251 on the frame 32, merely rides out on a tooth of the bar 219 and drops beneath the tooth so as to prevent the bar from dropping back after it has been raised. A spring 252 holds the pawl 220 against the bar 219.

In the normal operation of assembling a group of sheets together, each rotation of the shaft 51 carries the lever 189 through one cycle of operations so as to advance the ratchet wheel 196 and with it the shaft 151 one step. At the same time this action takes place, the cam 240 causes the pawl 221 to lift the ratchet wheel 219 one step, and the pawl 220 holds the ratchet wheel in this raised position. This action continues until the bumper 239 on the ratchet bar 219 reaches a level where it engages the pin 213 on the plate 209, as shown in Figs. 13 and 16, and holds the plate 209, against the tension of the spring 210, from following the lever 189. When this occurs, there is sufficient lost motion between the lever 189 and the plate 209 to cause the lever 189 to carry the pawl 191 off of the projection 208 and permit the pawl 191 to drop down into engagement with the teeth of the ratchet wheel 196 before the lever 189 reverses its direction of movement. Then on the advance stroke of the lever 189, the pawl 191 moves the ratchet wheel 196 with it and holds the plate 209 in the same position relative to the lever 189 as is shown in Fig. 13 until the parts reach the position shown in Fig. 14. This movement results in turning the shaft 151 and its associated rollers together with the shaft 166 through a sufficient angle to move the last sheet of the group which has just been assembled through the rollers and onto the conveyor tapes, thereby clearing the table 100 so that a new group of sheets may be started.

The advance movement of the lever 189 just described also causes the plate 209 to press against the pin 216 on the plate 215 and rock the plate 215 about the shaft extension 190 as a pivot. The plate 215 carries an inturned lip 253 which is moved up against the pawl 220 and forces the pawl out away from the bar 219 as shown in Fig. 14. The pawl 220 being released, the bar 219 is free to fall and drops back until the bumpers 238 and 239 stop it, thereby automatically resetting the bar 219 for a new group of sheets. In order to maintain the plate 215 in alignment, it is provided with a pin 254 which rides in a slot 255 of a plate 256 that is fixed upon the side frame 32 by screws 257 and is bent outwardly and then upwardly as illustrated best in Figs. 7 and 10.

The lever 189 in its reverse movement returns the parts to starting position shown in Fig. 10, and, as the pawl 191 is forced out over the teeth of the ratchet wheel 196, it moves out far enough to engage the rounded portion of the projection 208 on the plate 209 and permit the projection 208 to again move under the pawl 191. As the lever 189 reaches the limit of its movement in the reverse direction, it engages the pin 218 on the plate 215 and pushes the plate 215 back into normal resting position thereby releasing the pawl 220 so it may again engage the teeth on the ratchet bar 219.

In the feeding of the assembled sheets through the rollers 152 to 155 and the rollers 178 to 181, and in the subsequent handling thereof before they are finally secured together, it would completely destroy the utility of the groups of sheets if any sheet could get out of register with respect to the other sheets. The present machine provides means whereby this danger is overcome by temporarily securing the sheets to each other as each individual sheet is positioned with respect to the preceding sheets and when the rollers have advanced the newly positioned sheets from the point where it is left by the assembling and positioning fingers 105 and 110.

Referring now particularly to Figs. 32 to 36 inclusive, the mechanism whereby the sheets are fixed together temporarily to prevent their becoming separated while passing through the machine and to subsequently aid in holding them in alignment will be described. A pair of shaft supporting brackets 258 and 259 are mounted on top of the top plate 36 and support a rock shaft 260. The rock shaft 260 has fixed thereto a pair of arms 261 and 262. Each of the arms 261 and 262 has an elongated aperture 263 therein which aperture receives a pin 264 that passes through the upper end 265 of a pricking device 266. The pricking devices 266 are simply elongated rods provided with reduced sharp points 267, the rods 266 being guided in bearing blocks 268 secured beneath the top plate 36 by bolts 269 (see Fig. 32). It will be evident that, by rocking the shaft 260 between the full line and dotted line positions shown in Fig. 32, the pricking devices 266 will be moved between the two positions shown in Fig. 32.

The result of sticking the sharp points 267 through the sheets is illustrated best by the showing in Figs. 34, 35, and 36 where the opening formed in the sheets is shown to distort the sheets and interlock them together. As shown best by Fig. 36, the point 267 in passing through a sheet of paper tends to distort the paper and form a projection P on the lower side of the sheet. Where two sheets are overlapped, these projections P cause an interlock because the distortion of the material has the effect of enlarging the upper end of the opening formed in the sheet as indicated at R in Fig. 36. Therefore, the projection at the lower side of the top sheet will wedge down into the enlarged opening at the top surface of the lower sheet. This action continues as the sheets overlap forming a temporary but very effective connection between the sheets which prevents one of them from slipping with respect to the other, and preventing the sheets from being moved out of their registered position with respect to each other except by actually lifting the sheets apart in a direction transverse to their surfaces. The pricking devices 266 are arranged directly in alignment with the tapes 158 and 159 on steel rollers 156 and 157 so that the sheets will have a somewhat yielding backing where the pricking devices strike them.

It is highly essential that the sheets at the time of being pricked together be properly registered. The gear 161 is utilized for the purpose of locking the shaft 151 and its rollers against movement during the pricking operation so they will not displace the sheets. The shaft 260 is driven by means of an arm 270 fixed on the shaft, a link 271, a pivoted bar 272 to which the link 271 is secured, a roller 273 on the bar 272, and a cam 274 on the shaft 51. The bar 272 is pivoted at 275 on a bracket 276 mounted on the side frame 33 and carries a V-shaped tooth 277 engaging in V-shaped recesses between the teeth of the gear wheel 161. A spring 278 is connected to the end of the bar 272 opposite the tooth 277 and is secured to a pin 279 on the side frame 33. The spring 278 holds the roller 273 against the cam 274. The arrangement of the cam 274 with respect to the other controlling cams carried by the shaft 51 is such that the roller 273 rides upon the small part of the cam 274 during the time that the shaft 151 is stationary, and the roller 273 rides up upon the larger part of the cam 274 to withdraw the pricking devices 266 before the shaft 151 starts to move. The tooth 277 cooperating with the gear wheel 161 serves as a positive lock to lock the shaft 151 stationary during the pricking operation. Moreover, the wedging of the tooth 277 between the gear teeth on the gear 161 accurately sets the rollers 108 and 109 every time a new sheet has been positioned and the pricking devices are brought down to puncture the sheet. The two pricking devices 266, being spaced apart a substantial distance and being in alignment with the tapes 158 and 159, secure the several sheets together at the place where they are most apt to be drawn apart in passing through the machine, that is the place where they are contacted by the feeding tapes 158 and 159.

The assembled sheets are advanced as they leave the rollers 108 and 109 by the conveyor tapes 158 and 159 and cooperating tapes or belts 280 and 281 which are guided by a plurality of pairs of rollers 282, 283, 284, etc. At the rear end of the machine, as shown in Fig. 2, the conveyor tapes 158 and 159 pass around rollers 285 on a shaft 286. This shaft also carries a gear 287 which meshes with a gear 288 on a shaft 289 which also carries rollers for the conveyor tapes 280 and 281 thus assuring that the conveyor tapes 280 and 281 will move in unison with the tapes 158 and 159.

As the sheets are carried along by the tapes 158 and 159 and 280 and 281, they are glued together along one side edge as described in the Bergsten application hereinbefore mentioned. The sets of rollers 282, 283, and 284 are mounted as shown in Fig. 27. Each pair of rollers is carried by a shaft 290 which is guided in slots 291 and 292 of a pair of angle irons 293 and 294. A pair of pressure blocks 295 and 296 are suspended from the angle irons 293 and 294 by pins 297 and 298. A spring 299 forces the pressure block 295 down upon the shaft 290, and a spring 300 likewise presses the block 296 down on the shaft 290. It is not necessary that all of the sets of rollers such as 282 be spring pressed, but those immediately preceding and adjacent to the gluing mechanism 13 preferably are provided with the spring mechanism so as to cause the tapes 280 and 281 to press the sheets firmly together and thereby aid in holding the sheets interlocked by keeping the punched portions P of the sheets under pressure. The angle iron supporting bars 293 and 294 are secured to the top plate 36 at the forward end of the machine and are secured to the frame 44 at the rear end of the machine. Suitable idler rollers such as shown at 301 in Fig. 8 may be provided at spaced intervals along the tapes 280 and 281 as desired.

In supplying glue to the side edges of the sheets by gluing mechanism 13, means are provided whereby the sheets are caused to separate as they approach the gluing mechanism in order that the glue may be fed between the sheets and thus secure each sheet to the adjacent sheets sufficiently to hold them permanently together but in such a fashion that they may be readily separated by spreading them apart. This is accomplished by feeding the glue in small quantities between the sheets and thereafter drying the glue without pressing the sheets together where the glue is inserted.

The gluing mechanism comprises a glue container 303 which is supported by a bracket 304 mounted on angle irons 293 and 294, the bracket 304 carrying a frame 305 which extends around the lower end of the container 303. An L-shaped bar 306 is also carried by the member 305, and a second bracket 307 supports the L-shaped member 306 at a distance from the container 303 toward the rear end of the machine. The glue container has a filling inlet 308 with a cap 309. An outlet 310 leads from the container 303 through the L-shaped member 306 so as to supply glue to the edges of sheets riding on this member. A needle valve 311 controls the outlet 310. A knurled knob 312 is provided on the stem of the needle valve 311 which is screw threaded in the top of the container 303.

Means are provided whereby the sheets as they approach the gluing mechanism will have their edges separated so as to permit the glue to flow between the sheets. As shown in Fig. 1, the L-shaped member 306 extends toward the front of the machine beyond the gluing mechanism, but is cut off so that only the lower portion 306' thereof remains and this portion is bent downwardly. A guide rail 313 is mounted on the bed 23 and is rounded so as to lift up the sheets and cause them to ride over the extended portion 306' of the L-shaped member 306. A guide member 314 supported at its forward end from the top plate 36 extends over the lower portion of the L-shaped member 306 and is provided with a rounded notch 315 directly opposite the glue outlet 310. As illustrated best in Figs. 28 and 29, the sheets as they ride along the guide member 314 are bent upwardly by the guide rail 313 so as to press against the guide member 314 and ride into the notch 315 and then out again. The forward edges of the sheets separate due to the contour of the notch 315 and permit the glue to enter between the sheets in the manner shown in Fig. 31 where the glue is indicated by G in an exaggerated condition, of course, because the layer of glue is very thin.

After the glue is applied, the sheets move on to the heating and drying device 14 which is shown best in Figs. 2 and 3. The heating and drying device comprises a pair of drying chambers 316 and 317 each of which is supplied with electric current from a junction box 318 carried by the standard 24 by means of leads 319 and 320. The drying chambers are covered by an insulating cover 321 shown in cross section in Fig. 3, and the cover 321 has suspended therefrom by means of a post 322 a heating element 323 to which the leads 319 and 320 are connected by suitable terminals 324. The covers 321 have supporting plates 321' bent downwardly and extended under the angle iron 293. By lifting the covers 321 slightly, they may be moved lengthwise along the angle iron 293 and 294 to the desired position.

The standard 24' also supports the frame 24 which carries a pair of arms 326 provided with rollers 327 for maintaining the conveyor tapes or belts 158 and 159 under the proper tension. Two idler rollers 328 are also mounted in the frame 24 for the tapes 158 and 159 to ride over. At the top of the frame 24, a frame 330 carries a series of guide rollers 331, 332, and 333 for the conveyor tapes 280 and 281. The rollers 333 are vertically adjustable in a slot 334 and may be secured by a nut 335 for keeping the tapes 280 and 281 taut.

In order that the tapes 158 and 159 will be maintained in proper position on the rollers 156 and 157, the base plate 28 carries a plate 336 having a number of upright pins 337 arranged on opposite sides of the tapes 158 and 159 so as to position them on the rollers 156 and 157. The tapes 158 and 159 pass between the pins 337 and over a bar 338 which is carried by the side frames 32 and 33.

The operation of the machine has been described in detail with the parts of the machine, however, in order that it may be fully understood, a brief résumé of the operation will be given.

Assuming that the feed tray 10 has been supplied with sheets and that the gluing mechanism 13 and the heating and drying mechanism 14 are in operative position, the machine is started by starting the motor 25 whereupon the roller 80 which is driven intermittently picks a front sheet off of the stack of sheets in the tray 10 and advances it over the lip 10b of the tray to the driven roller 72 and its cooperating rollers 74 and 75 which feed it to the conveyor tapes 71 driven by the roller 70. The conveyor tapes 71 deliver the sheet through the rolls 90 and 91 onto the assembling table 100. The fingers 98 direct the sheet downwardly onto the table 110, and the fingers 105 are actuated to press the sheet to the margin bar 104, also the fingers 110 are advanced to move the sheet into the bight of the rollers 108 and 109 which up to this time have not been moved and are stationary. The pricking devices 266 are down at this time, but start upward near the end of the advance stroke of the fingers 110 reaching their uppermost position by the time the fingers 110 reach the limit of their advance. When this has been done, the mechanism is so timed that the rollers 108 and 109 are advanced a step by the engagement of the pawl 192 with the teeth of the ratchet wheel 196 which produces a limited rotation of the shaft 151, and the fingers 110 start back. When the rollers 108 and 109 stop, the pricking devices 266 are brought down and the sheet is punched by these devices, the fingers 110 moving back while the devices 266 punch the sheet.

The length of the step by which the rollers 108 and 109 will be turned has been predetermined by adjusting the plate 197 so that the pin 204 seats in the desired notch 203 indicated by the scale 202. Also, the operator has set the indicator 233 of the member 228 for the desired number of sheets he wishes to assemble in each group.

While the first sheet is being received and positioned, a second sheet is on its way from the tray 10 and is fed down onto the table 100 in the same fashion as the first sheet was fed. By the time the second sheet arrives upon the table 100, the rollers 108 and 109 are again at rest, and the pricking devices 266 are down. Also, the fingers 105 and 110 are moved back ready to receive the new sheet. The new sheet is positioned in exactly the same manner as the first, but in this case, since the first sheet has been advanced a step, it lies between the rollers 108 and 109 while the second sheet can only advance until it contacts the rollers 109. The fingers 105 and 110 position the second sheet in this position. The rollers advance both sheets and the pricking devices 266 then punch both sheets, the registration of the sheets being thus positively assured. During the pricking operation, the tooth 277 on the arm 272 locks the shaft 151 against movement.

This operation is continued as sheets are intermittently fed to the table 100 until the number of sheets for which the pointer 233 was set have been supplied. When this number of sheets has been supplied, the bumper 239 on the ratchet bar 219 is moved up so that it will be engaged on the return stroke of the lever 189 by the pin 213 on the plate 209, thus causing a relative movement between the lever 189 and the plate 209 sufficient to move the pawl 191 off the projection 208 and into engagement with the ratchet wheel 196. The next advance movement, therefore, carries the rollers 108 and 109 through substantially a half revolution of the shaft 151 which is sufficient to move the entire block of sheets off of the table 100 and out of the range of the pricking devices 266.

This block of sheets is advanced by the tapes 158 and 159 to the gluing mechanism 13 where the sheets are separated by the guide rail 313 and the guide member 314 as they pass the outlet 310 from the glue container 303. The glue is thus placed between the edges of the sheets which are still maintained in proper alignment by the prick punchings, and the sheets are carried along in a group through the heating chambers 316 and 317 and discharged onto the receiving tray 15.

The machine continues to advance sheets from the stack on the tray 10 and to assemble them in the fashion just described until the desired number of groups of sheets has been assembled.

The operator may at any time, by the simple adjustments provided, change the degree of overlapping the sheets to provide whatever margin he desires. He also may change the number of sheets that are to be secured together in any particular group. That is, he may need only a half dozen sheets in one series of assemblies, while the next series may require 20 sheets to be assembled in overlapped relationship. The operator can make these assemblies and provide the required margin on the sheets at the time the sheets are secured together in the groups.

Since the sheets at the time they are positioned on the assembling table are temporarily secured together by the prick punching, the spacing and alignment of the sheets will be uniform in any particular group or series of groups for which the margin has not been changed.

While certain embodiments of the invention have been shown and described, it is to be understood that it is capable of many modifications. Changes, therefore, in the construction and arrangement may be made without departing from the spirit and scope of the invention as disclosed in the appended claims in which it is the intention to claim all novelty inherent in the invention as broadly as possible in view of the prior art.

Having thus described the invention, what we claim as new and desire to secure by Letters Patent is:

1. A machine of the character described comprising a sheet feeding device, a positioning table, feed rollers for drawing sheets off said table, means for pressing one edge of each sheet fed to said table into engagement with said rollers, means to turn said rollers a predetermined amount after each sheet is fed thereto whereby to pass said sheets through said rollers in overlapped relation, and means securing said overlapped sheets together along one side edge thereof.

2. A machine of the character described comprising a sheet feeding device, a positioning table, feed rollers for drawing sheets off said table, means for pressing one edge of each sheet fed to said table into engagement with said rollers, means to turn said rollers a predetermined amount after each sheet is fed thereto whereby to pass said sheets through said rollers in overlapped relation, means securing said overlapped sheets together along one side edge thereof, and control means for said turning means operable to predetermine the extent of overlapping of said sheets.

3. A machine of the character described comprising a sheet feeding device, a positioning table, feed rollers for drawing sheets off said table, means for pressing one edge of each sheet fed to said table into engagement with said rollers, means to turn said rollers a predetermined amount after each sheet is fed thereto whereby to pass said sheets through said rollers in overlapped relation, means securing said overlapped sheets together along one side edge thereof, and means to connect the overlapped portion of said sheets together when they pass between said rollers.

4. A machine of the character described comprising a sheet feeding device, a positioning table, feed rollers for drawing sheets off said table, means for pressing one edge of each sheet fed to said table into engagement with said rollers, means to turn said rollers a predetermined amount after each sheet is fed thereto whereby to pass said sheets through said rollers in overlapped relation, and means to connect the overlapped portion of said sheets together when they pass between said rollers.

5. A machine of the character described comprising a sheet feeding device, a positioning table, feed rollers for drawing sheets off said table, means for pressing one edge of each sheet fed to said table into engagement with said rollers, means to turn said rollers a predetermined amount after each sheet is fed thereto whereby to pass said sheets through said rollers in overlapped relation, and means to connect the overlapped portion of said sheets together when they pass between said rollers, said connecting means comprising a pair of reciprocating members adapted to strike the overlapped sheets adjacent to said rollers and to perforate said sheets so as to provide interlocking parts thereon.

6. A machine of the character described comprising a sheet conveyor, a positioning device adapted to position a succession of sheets in front of and adjacent the conveyor where each sheet in turn will be engaged by said conveyor, intermittent drive means for said conveyor operable to advance the conveyor and the sheets engaged thereby step by step in one direction, the steps being only fractions of the dimension of a sheet in the direction of movement, and sheet connecting means operable during the intervals between movements of said conveyor to connect each overlapped sheet to the preceding sheets.

7. A machine of the character described comprising a sheet conveyor, a positioning device adapted to position a succession of sheets in front of and adjacent the conveyor where each sheet in turn will be engaged by said conveyor, intermittent drive means for said conveyor operable to advance the conveyor and the sheets engaged thereby step by step in one direction, the steps being only fractions of the dimension of a sheet in the direction of movement, and sheet connecting means operable during the intervals between movement of said conveyor to connect each overlapped sheet to the preceding sheets, said connecting means comprising pricking devices adapted to strike the sheets adjacent to said conveyor.

8. A machine of the character described comprising a sheet conveyor, a positioning device adapted to position a succession of sheets in front of and adjacent the conveyor where each sheet in turn will be engaged by said conveyor, intermittent drive means for said conveyor operable to advance the conveyor and the sheets engaged thereby step by step in one direction, the steps being only fractions of the dimension of a sheet in the direction of movement, and sheet connecting means operable during the intervals between movement of said conveyor to connect each overlapped sheet to the preceding sheets, said connecting means comprising pricking devices adapted to strike the sheets adjacent to said conveyor, said pricking devices being spaced transversely of said conveyor.

9. A machine of the character described comprising a sheet conveyor, a positioning device adapted to position sheets in overlapped relation to be engaged by said conveyor, intermittent drive means for said conveyor, sheet connecting means operable during the intervals between movements of said conveyor to connect each overlapped sheet to the preceding sheets, and means to secure the overlapped sheets together along one side edge thereof as they are advanced by said conveyor.

10. A machine of the character described comprising a sheet conveyor, a positioning device adapted to advance a plurality of sheets in the same direction for positioning said sheets in overlapped relation with each sheet projecting beyond the superposed sheet a fraction of its length whereby the sheets are successively engaged by said conveyor, and means to secure the overlapped sheets together along one side edge thereof as they are advanced by said conveyor.

11. A machine of the character described comprising a sheet conveyor, a positioning device adapted to position sheets in overlapped relation to be engaged by said conveyor, and means to secure the overlapped sheets together along one side edge thereof as they are advanced by said conveyor, said securing means comprising an adhesive supplying device adapted to feed adhesive to one side edge of the overlapped sheets.

12. A machine of the character described comprising a sheet conveyor, a positioning device adapted to position sheets in overlapped relation to be engaged by said conveyor, and means to secure the overlapped sheets together along one side edge thereof as they are advanced by said conveyor, said securing means comprising an adhesive supplying device adapted to feed adhesive to one side edge of the overlapped sheets, and means to separate the side edges of said sheets as they receive the adhesive whereby to permit the adhesive to enter between the sheets.

13. A machine of the character described comprising a sheet conveyor, a positioning device adapted to position sheets in overlapped relation to be engaged by said conveyor, intermittent drive means for said conveyor, sheet connecting means operable during the intervals between movements of said conveyor to connect each overlapped sheet to the preceding sheets, and means to secure the overlapped sheets together along one side edge thereof as they are advanced by said conveyor, said securing means comprising an adhesive supplying device adapted to feed adhesive to one side edge of the overlapped sheets.

14. A machine of the character described comprising a sheet feeding device, a positioning table, feed rollers for drawing sheets off said table, means for pressing one edge of each sheet fed to said table into engagement with said rollers, means to turn said rollers a predetermined amount after each sheet is fed thereto whereby to pass said sheets through said rollers in overlapped relation, and means securing said overlapped sheets together along one side edge thereof, said securing means comprising an adhesive supplying device adapted to feed adhesive to one side edge of the overlapped sheets.

15. A machine of the character described comprising a sheet feeding device, a positioning table, feed rollers for drawing sheets off said table, means for pressing one edge of each sheet fed to said table into engagement with said rollers, means to turn said rollers a predetermined amount after each sheet is fed thereto whereby to pass said sheets through said rollers in overlapped relation, and means securing said overlapped sheets together along one side edge thereof, said securing means comprising an adhesive supplying device adapted to feed adhesive to one side edge of the overlapped sheets, and means to separate the side edges of said sheets as they receive the adhesive whereby to permit the adhesive to enter between the sheets.

16. A machine of the character described comprising means for assembling a plurality of sheets in overlapped relationship, and means for connecting said sheets as they are assembled, said connecting means comprising a sheet pricking pin, and means to push said pin through the overlapped portions of said sheets, a conveyor receiving the sheets when they are connected by said pricking pin, and means connecting the sheets as they are advanced by said conveyor along one side edge thereof.

17. A machine of the character described comprising a sheet feeding device, a positioning table, feed rollers for drawing sheets off said table, means for pressing one edge of each sheet fed to said table into engagement with said rollers, means to turn said rollers a predetermined amount after each sheet is fed thereto whereby to pass said sheets through said rollers in overlapped relation, means securing said overlapped sheets together along one side edge thereof, and control means for said turning means operable to predetermine the extent of overlapping of said sheets, said control means comprising a pawl and ratchet wheel mechanism for advancing said rollers and a manually adjustable shield for holding the pawl out of engagement with the ratchet wheel.

18. A machine of the character described comprising a sheet feeding device, a positioning table, feed rollers for drawing sheets off said table, means for pressing one edge of each sheet fed to said table into engagement with said rollers, means to turn said rollers a predetermined amount after each sheet is fed thereto whereby to pass said sheets through said rollers in overlapped relation, means securing said overlapped sheets together along one side edge thereof, and means to connect the overlapped portion of said sheets together before they pass beyond said rollers, said connecting means comprising a pricking pin and means to push said pin through the overlapped portions of said sheets.

19. A machine of the character described comprising a sheet conveyor, a positioning device adapted to position sheets in overlapped relation to be engaged by said conveyor, intermittent drive means for said conveyor, and sheet connecting means operable during the intervals between movements of said conveyor to connect each overlapped sheet to the preceding sheets when it is advanced by the conveyor, said positioning device comprising a table at the front of said conveyor, a sheet guide at one side of said table, positioning fingers for pressing sheets against said guide, positioning fingers for pressing sheets toward engagement with the conveyor, and actuating means for said fingers operating in timed relation to the intermittent drive means for the conveyor whereby to position the sheets while the conveyor is at rest.

20. A machine of the character described comprising a sheet conveyor, a positioning device adapted to position a succession of sheets in front of and adjacent the conveyor where each sheet in turn will be engaged by said conveyor, intermittent drive means for said conveyor operable to advance the conveyor and the sheets engaged thereby step by step in one direction, the steps being only fractions of the dimension of a sheet in the direction of movement, and sheet connecting means operable during the intervals between movement of said conveyor to connect each overlapped sheet to the preceding sheets, said connecting means comprising pricking devices adapted to strike the sheets adjacent to said conveyor, said conveyor having means to apply pressure to the pricked portions of said sheets.

21. A machine of the character described comprising a sheet conveyor, a positioning device adapted to position sheets in overlapped relation to be engaged by said conveyor, means to connect the advancing end of each sheet to the preceding sheet, and means to secure the overlapped sheets together along one side edge thereof as they are advanced by said conveyor.

22. A machine of the character described comprising a sheet conveyor, a positioning device adapted to position sheets in overlapped relation to be engaged by said conveyor, and means to secure the overlapped sheets together along one side edge thereof as they are advanced by said conveyor, and drive means for said conveyor, said drive means comprising intermittent drive mechanism operable to advance the conveyor by a series of steps each only a fraction of the length of the sheet being fed to the conveyor, and control means operable at intervals to cause said conveyor to advance a long step longer than the sheet being fed.

23. A machine of the character described comprising a sheet conveyor, a positioning device adapted to position sheets in overlapped relation to be engaged by said conveyor, and means to secure the overlapped sheets together along one side edge thereof as they are advanced by said conveyor, and drive means for said conveyor, said drive means comprising intermittent drive mechanism operable to advance the conveyor by a series of steps each only a fraction of the length of the sheet being fed to the conveyor, and control means operable at intervals to cause said conveyor to advance a long step longer than the sheet being fed, said control means being manually adjustable whereby to vary the interval between the long step advances of the conveyor.

24. A machine of the character described comprising in combination, means to assemble sheets in overlapped relation, means to secure said sheets together along lines transverse to the direction of overlapping them, and means to secure one edge of said sheets together in the direction of overlapping.

25. A machine for attaching a plurality of sheets to each other comprising means to position a succession of sheets upon a table, means engaging the sheets after they are positioned on said table, and successively advancing each of them a fraction of its length before the next sheet is positioned on said table, whereby the sheets pass from said table with a part of the advancing end of each sheet projecting beyond the next sheet and means for securing said part of each sheet to the preceding sheet as they are removed from the table.

26. A machine of the character described comprising a sheet conveyor, a positioning device adapted to position a succession of sheets in front of and adjacent the conveyor where each sheet in turn will be engaged by said conveyor, intermittent drive means for said conveyor operable to advance the conveyor and the sheets engaged thereby step by step in one direction, the steps being only fractions of the dimension of a sheet in the direction of movement, and sheet connecting means comprising means engaging the advancing end portion of a sheet and connecting it to the preceding sheet that has been advanced by said conveyor.

27. A machine of the character described adapted to assemble and deliver units of sheets wherein the units comprise a plurality of sheets, the number of which is predetermined, and wherein the sheets in a unit are releasably attached to each other in such relation as to expose along one side edge of the unit a narrow portion of the top surface of each sheet below the top sheet, said machine comprising sheet overlapping means, conveyor means for advancing the sheets, and securing means for attaching each sheet of a unit to the adjacent sheet or sheets, said securing means comprising an adhesive applying device operable upon the several sheets, as they are advanced, to apply adhesive to the surfaces of the sheets along a line at right angles to the narrow exposed portions of the sheets, and at one edge of the unit.

28. A machine of the character described adapted to assemble and deliver units of sheets wherein the units comprise a plurality of sheets, the number of which is predetermined, and wherein the sheets in a unit are releasably attached to each other in such relation as to expose along one side edge of the unit a narrow portion of the top surface of each sheet below the top sheet, said machine comprising, in combination, advancing means, a positioning device arranging the sheets in overlapped relation, and means for causing the several sheets of a unit to adhere together, said means comprising a device for applying adhesive to the engaging surfaces of said sheets.

29. A machine of the character described adapted to assemble and deliver units of sheets wherein the units comprise a plurality of sheets, the number of which is predetermined, and wherein the sheets in a unit are releasably attached to each other in such relation as to expose along one side edge of the unit a narrow portion of the top surface of each sheet below the top sheet, said machine comprising, in combination, advancing means, a positioning device arranging the sheets in overlapped relation, and means for causing the several sheets of a unit to adhere together, said means comprising a device for applying adhesive to the engaging surfaces of said sheets, said adhesive applying device including means directing a liquid adhesive between the edges of the sheets while they are overlapped.

30. A machine of the character described adapted to assemble and deliver units of sheets wherein the units comprise a plurality of sheets, the number of which is predetermined, and wherein the sheets in a unit are releasably attached to each other in such relation as to expose along one side edge of the unit a narrow portion of the top surface of each sheet below the top sheet, said machine comprising, in combination, advancing means, a positioning device arranging the sheets in overlapped relation, means for causing the several sheets of a unit to adhere together, said last named means comprising an adhesive supply means, and means to deposit a line of adhesive from said supply means to the surfaces of said sheets in a direction at right angles to the said exposed portions.

31. A machine of the character described comprising, in combination, a delivering and positioning device adapted to successively position sheets one upon the other, means acting upon succeeding sheets to cause them to adhere to previously positioned sheets, and advancing means for advancing the positioned sheets step by step between successive positionings of new sheets, whereby to overlap the several sheets a like amount.

32. A machine of the character described comprising, in combination, a delivering and positioning device adapted to successively position sheets one upon the other, means acting upon succeeding sheets to cause them to adhere to previously positioned sheets, advancing means for advancing the positioned sheets step by step between successive positionings of new sheets, whereby to overlap the several sheets a like amount, power driven means for actuating the advancing means, and manually operable means to vary the length of the steps of advance.

33. A machine of the character described comprising, in combination, a delivering and positioning device adapted to successively position sheets one upon the other, means acting upon succeeding sheets adjacent one side edge thereof to cause them to adhere to previously positioned sheets, and advancing means for advancing the positioned sheets step by step between successive positionings of new sheets, whereby to overlap the several sheets a like amount.

ALFRED MARCHEV.
CECIL C. McCAIN.